US011028253B2

(12) United States Patent
Miyazaki et al.

(10) Patent No.: US 11,028,253 B2
(45) Date of Patent: Jun. 8, 2021

(54) RESIN COMPOSITION AND RESIN MOLDED ARTICLE

(71) Applicant: Eastman Chemical Company, Kingsport, TN (US)

(72) Inventors: Kana Miyazaki, Minamiashigara (JP); Ryo Tanaka, Minamiashigara (JP); Kenji Yao, Minamiashigara (JP)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 16/262,029

(22) Filed: Jan. 30, 2019

(65) Prior Publication Data

US 2020/0071499 A1 Mar. 5, 2020

(30) Foreign Application Priority Data

Aug. 31, 2018 (JP) .............................. JP2018-164068

(51) Int. Cl.
| | | |
|---|---|---|
| *C08L 1/14* | (2006.01) | |
| *C08L 1/10* | (2006.01) | |
| *B29C 45/00* | (2006.01) | |
| *B29K 1/00* | (2006.01) | |

(52) U.S. Cl.
CPC ............ *C08L 1/14* (2013.01); *B29C 45/0001* (2013.01); *C08L 1/10* (2013.01); *B29K 2001/12* (2013.01); *C08L 2205/03* (2013.01); *C08L 2205/06* (2013.01); *C08L 2207/53* (2013.01)

(58) Field of Classification Search
CPC ...... C08L 1/14; C08L 1/10; C08L 1/12; C08L 67/04; C08L 75/04; C08L 2005/06; C08L 2205/03; C08L 2205/06; C08L 2207/53; B29C 45/0001; B29K 2001/12; C08K 5/0016; C08K 67/06
USPC ....................................................... 523/201
See application file for complete search history.

(56) References Cited

U.S. PATENT DOCUMENTS

| | | | | |
|---|---|---|---|---|
| 10,414,905 | B2 * | 9/2019 | Yao | ........................... C08K 5/10 |
| 2007/0257239 | A1 * | 11/2007 | Yamada | ............... C08K 5/3415 |
| | | | | 252/601 |
| 2008/0287579 | A1 * | 11/2008 | Okoshi | .............. C08K 5/34928 |
| | | | | 524/100 |
| 2011/0319529 | A1 | 12/2011 | Helmer et al. | |
| 2011/0319530 | A1 | 12/2011 | Helmer et al. | |
| 2011/0319531 | A1 | 12/2011 | Helmer et al. | |
| 2011/0319532 | A1 | 12/2011 | Helmer et al. | |
| 2013/0131221 | A1 | 5/2013 | Basu et al. | |
| 2013/0150484 | A1 | 6/2013 | Basu et al. | |
| 2013/0150491 | A1 | 6/2013 | Basu et al. | |
| 2013/0150492 | A1 | 6/2013 | Shelby et al. | |
| 2013/0150493 | A1 | 6/2013 | Shelby et al. | |
| 2013/0150494 | A1 | 6/2013 | Basu et al. | |
| 2013/0150495 | A1 | 6/2013 | Shelby et al. | |
| 2013/0150496 | A1 | 6/2013 | Basu et al. | |
| 2013/0150497 | A1 | 6/2013 | Basu et al. | |
| 2013/0150498 | A1 | 6/2013 | Basu et al. | |
| 2013/0150499 | A1 | 6/2013 | Basu et al. | |
| 2013/0150500 | A1 | 6/2013 | Shelby et al. | |
| 2013/0150501 | A1 | 6/2013 | Basu et al. | |
| 2016/0090473 | A1 * | 3/2016 | Yao | ........................... C08L 1/14 |
| | | | | 524/40 |
| 2018/0230296 | A1 * | 8/2018 | Yao | ....................... C08K 5/0016 |
| 2019/0092928 | A1 * | 3/2019 | Tanaka | ........................ C08L 1/14 |
| 2019/0092929 | A1 * | 3/2019 | Tanaka | ........................ C08L 1/14 |
| 2019/0144637 | A1 * | 5/2019 | Yao | ........................... C08K 5/11 |
| 2020/0071503 | A1 * | 3/2020 | Miyazaki | ................... C08L 1/14 |
| 2020/0071504 | A1 * | 3/2020 | Miyazaki | ................... C08L 1/12 |

FOREIGN PATENT DOCUMENTS

| | | |
|---|---|---|
| JP | 2015-505877 A | 2/2015 |
| JP | 2015-044975 A | 3/2015 |
| JP | 2015-218252 A | 12/2015 |
| JP | 6323605 B1 | 5/2018 |
| WO | 2008/089573 A1 | 7/2008 |

* cited by examiner

*Primary Examiner* — Hannah J Pak

(74) *Attorney, Agent, or Firm* — Robert C. Morriss

(57) ABSTRACT

Provided is a resin composition containing: cellulose acylate (A); at least a polymer (B) selected from a group consisting of: a polymer (b1) having a core-shell structure including a core layer containing a butadiene polymer, and a shell layer located on an surface of the core layer and containing a polymer selected from a styrene polymer and an acrylonitrile-styrene polymer; a styrene-ethylene-butadiene-styrene copolymer (b2); polyurethane (b3); and aromatic polyester (b4); and a plasticizer (C). A resin molded article obtained by molding the resin composition satisfies at least one of the following conditions (1) and (2): (1) a heat distortion temperature measured in accordance with an ASTM D648-07 B method is 95° C. or less; and (2) a heat distortion temperature measured in accordance with an ISO 75-2 A method (2013) is 80° C. or less.

19 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2018-164068 filed on Aug. 31, 2018.

BACKGROUND

Technical Field

The present invention relates to a resin composition and a resin molded article.

Related Art

Patent Document 1 discloses "a resin composition containing a cellulose ester resin in an amount of 50 phr to 99 phr, and acrylonitrile-butadiene-styrene resin in an amount of 1 phr to 50 phr that includes a surface layer containing an acrylonitrile-styrene copolymer on a surface of a core of a butadiene polymer".

Patent Document 2 discloses "an elastomer composition containing at least one non-fibrillated cellulose ester, at least one non-nitrile primary elastomer, optionally starch, and one or more fillers in an amount of at least 70 parts to per 100 parts of rubber (phr), in which the weight ratio of the cellulose ester to the starch is at least 3:1, and the cellulose ester is in the form of particles having an average diameter of 10 Lm or less".

Patent Document 3 discloses "a cellulose ester composition containing (A) 100 parts by mass of cellulose ester, (B) 2 to 100 parts by mass of plasticizers, (C) 0.5 to 10 parts by mass of methyl methacrylate resin (elastomer is not contained), and (D) 1 to 50 parts by mass of thermoplastic elastomers containing alkyl (meth) acrylate units".

Patent Document 4 discloses "a resin composition containing a cellulose ester compound (A), a poly (meth) acrylate compound (B) containing 50 mass % or more of constituent units derived from alkyl (meth) acrylate, polyester resin (C), and at least a polymer (D) selected from: a polymer having a core-shell structure including a core layer and an alkyl (meth) acrylate polymer-containing shell layer on a surface of the core layer; and an olefinic polymer that is a polymer of α-olefin and alkyl (meth) acrylate, and contains 60 mass % or more of constituent units derived from the α-olefin".

Patent Document 5 discloses "a cellulose ester composition containing at least one cellulose ester of 55 mass % to 99 mass %, at least one impact modifier of 1 mass % to 30 mass %, and at least one plasticizer of 15 mass % or less".

PRIOR ART DOCUMENT

Citation List

Patent Document 1: JP-A-2015-218252
Patent Document 2: JP-A-2015-505877
Patent Document 3: JP-A-2015-044975
Patent Document 4: JP-B-6323605
Patent Document 5: WO 2008/089573

SUMMARY

A resin molded article obtained by molding a resin composition containing cellulose acylate has a high friction coefficient. Therefore, for example, when the resin molded article containing cellulose acylate is rubbed, squeaking noises tend to generate.

Aspects of non-limiting embodiments of the present disclosure relate to provide a resin composition capable of forming a resin molded article in which squeaking noises are prevented, compared with a case where a resin composition contains cellulose acylate, and a resin molded article obtained by molding the resin composition has a heat distortion temperature exceeding 95° C. as measured in accordance with an ASTM D648-07 B method and has a heat distortion temperature exceeding 80° C. as measured in accordance with an ISO 75-2 Å method (2013), or with a case where a resin composition only contains: cellulose acylate (A); and at least one polymer (B), which is selected from the group consisting of: a polymer (b1) having a core-shell structure that includes a shell layer containing a polymer selected from the group consisting of a styrene polymer and an acrylonitrile-styrene polymer; a styrene-ethylene-butadiene-styrene copolymer (b2); polyurethane (b3); and aromatic polyester (b4).

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a resin composition containing:
cellulose acylate (A);
at least a polymer (B) selected from a group consisting of:
a polymer (b1) having a core-shell structure including
a core layer containing a butadiene polymer, and
a shell layer located on an surface of the core layer and containing a polymer selected from a styrene polymer and an acrylonitrile-styrene polymer;
a styrene-ethylene-butadiene-styrene copolymer (b2);
polyurethane (b3); and
aromatic polyester (b4); and
a plasticizer (C), in which a resin molded article obtained by molding the resin composition satisfies at least one of the following conditions (1) and (2):
(1) a heat distortion temperature measured in accordance with an ASTM D648-07 B method is 95° C. or less; and
(2) a heat distortion temperature measured in accordance with an ISO 75-2 A method (2013) is 80° C. or less.

DETAILED DESCRIPTION

An exemplary embodiment which is an example of the present invention will be described below. These descriptions and examples are illustrative of the exemplary embodiments and do not limit the scope of the invention.

In the exemplary embodiment, a numerical range indicated by using "to" shows a range including numerical values written before and after "to" as a minimum value and a maximum value, respectively.

In the numerical ranges described in stages in the exemplary embodiment, an upper limit value or a lower limit value written in one numerical range may be replaced with an upper limit value or a lower limit value of a numerical range in other staged descriptions. In addition, in a numerical range described in the exemplary embodiment, an upper limit value or a lower limit value of the numerical range may be replaced with a value shown in an example, respectively.

In the exemplary embodiment, the term "process" includes not only an independent process, but also a process that is not clearly distinguished from other processes as long as the intended purpose of the process is achieved.

In the exemplary embodiment, each component may contain a plurality of corresponding substances. In the exemplary embodiment, when the amount of each component in the composition is referred to, it refers to the total amount of a plurality of substances exist in the composition in a case where the plurality of substances corresponding to each component in the composition exist, unless otherwise specified.

In the exemplary embodiment, "(meth) acryl" refers to at least one of acrylic and methacryl, and "(meth) acrylate" refers to at least one of acrylate and methacrylate.

In the exemplary embodiment, cellulose acylate (A), a polymer (B), a plasticizer (C), aliphatic polyester (D) are also referred to as a component (A), a component (B), a component (C), and a component (D), respectively.

<Resin Composition>

A resin composition according to the exemplary embodiment contains cellulose acylate (A), a polymer (B), and a plasticizer (C). The polymer (B) is at least one selected from the group consisting of: a polymer (b1) having a core-shell structure that includes a core layer containing a butadiene polymer, and a shell layer that is located on an surface of the core layer and contains a polymer selected from a styrene polymer and an acrylonitrile-styrene polymer; a styrene-ethylene-butadiene-styrene copolymer (b2); polyurethane (b3); and aromatic polyester (b4).

Then, a resin molded article obtained by molding the resin composition satisfies at least one of the following conditions (1) and (2):

(1) a heat distortion temperature measured in accordance with an ASTM D648-07 B method is 95° C. or less; and (2) a heat distortion temperature measured in accordance with an ISO75-2 A method (2013) is 80° C. or less.

The resin composition according to the exemplary embodiment may contain aliphatic polyester (D) and other components (E) if necessary.

A resin molded article obtained by molding a resin composition containing cellulose acylate has a high friction coefficient. Therefore, when the resin molded article containing cellulose acylate rubs against other objects, for example, the resin molded articles rub against each other, squeaking noises tend to occur. Squeaking noises are considered to be caused by vibration generated when a molded article is rubbed.

According to the resin composition of the exemplary embodiment, a resin molded article in which squeaking noises are prevented is obtained. The reason for prevention of squeaking noises is not clear, but is presumed as follows.

For example, it is considered that when cellulose acylate (A) is mixed with a flexible polymer, vibration generated when the resin molded article is rubbed, which causes the squeaking noises, is prevented. However, for example, it is difficult to prevent squeaking noises in a resin molded article in the case of a resin molded article obtained by molding a resin composition that only contains the cellulose acylate (A) and a flexible acrylic rubber based polymer. It is considered that the compatibility between the cellulose acylate (A) and the flexible acrylic rubber based polymer is too high, so that it is difficult to form an interface between them, and the vibration generated when the resin molded article is rubbed cannot be absorbed. Therefore, it is considered that the cellulose acylate (A) may be mixed with a polymer (such as the polymer (B)) that has a lower compatibility with the cellulose acylate (A) than the acrylic rubber based polymer. However, the affinity between the cellulose acylate (A) and the polymer (B) is low. If the cellulose acylate (A) is simply mixed with the polymer (B), the dispersibility of the polymer (B) is low. Therefore, a large interface is formed in a resin molded article formed by molding a resin composition that only contains the cellulose acylate (A) and the polymer (B). Meanwhile, the flexibility of the resin molded article is improved by lowering the thermal deformation temperature of the resin molded article. However, a large interface is generated if the cellulose acylate (A) is simply mixed with the polymer (B). Therefore, vibration still cannot be absorbed. Therefore, squeaking noises are likely to occur even though the thermal deformation temperature of the resin molded article is simply lowered.

In contrast, the plasticizer (C) is further mixed with the cellulose acylate (A) and the polymer (B) in the resin composition according to the exemplary embodiment, so that the affinity between the cellulose acylate (A) and the polymer (B) is appropriate, and the dispersibility of the polymer (B) is improved. As a result, since the interface formed between the cellulose acylate (A) and the polymer (B) exists in an appropriate amount, vibration is likely to be absorbed at the interface formed between the cellulose acylate (A) and the polymer (B) in the resin molded article obtained by molding this resin composition. Further, when the heat distortion temperature of the resin molded article obtained by molding the resin composition containing the cellulose acylate (A), the polymer (B), and the plasticizer (C) is set to equal to or less than a specified value, the flexibility of the resin molded article is improved. As a result, it is presumed that squeaking noises of the resin molded article containing cellulose acylate is prevented.

The components of the resin composition according to the exemplary embodiment will be described in detail below.

[Cellulose Acylate (A): Component (A)]

The cellulose acylate (A) is a cellulose derivative in which at least a part of hydroxy groups in the cellulose are substituted (acylated) with an acyl group. The acyl group refers to a group consisting of a structure of —CO—$R^{AC}$ ($R^{AC}$ represents a hydrogen atom or a hydrocarbon group).

The cellulose acylate (A) is, for example, a cellulose derivative represented by the following General Formula (CA).

General Formula (CA)

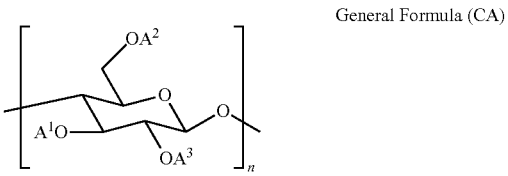

In the General Formula (CA), $A^1$, $A^2$ and $A^3$ each independently represent a hydrogen atom or an acyl group, and n represents an integer of 2 or more. However, at least a part among n $A^1$, n $A^2$, and n $A^3$ represents acyl groups. The n $A^1$ in the molecule may be all the same, partly the same, or different from each other. Similarly, the n $A^2$ and the n $A^3$ in the molecule may be all the same, partly the same, or different from each other.

The hydrocarbon group in the acyl group represented by $A^1$, $A^2$ and $A^3$ may be linear, branched or cyclic, and is preferably linear or branched, and more preferably linear.

The hydrocarbon group in the acyl group represented by $A^1$, $A^2$ and $A^3$ may be a saturated hydrocarbon group or an unsaturated hydrocarbon group, and is more preferably a saturated hydrocarbon group.

The acyl group represented by $A^1$, $A^2$ and $A^3$ is preferably an acyl group having 1 to 6 carbon atoms. That is, the cellulose acylate (A) is preferably cellulose acylate (A) in which the number of carbon atoms of the acyl group is 1 to 6. The cellulose acylate (A) in which the number of carbon atoms of the acyl group is 1 to 6 is more likely to form a resin molded article in which squeaking noises are prevented, compared with cellulose acylate (A) including an acyl group having 7 or more carbon atoms.

A hydrogen atom in the acyl group represented by $A^1$, $A^2$ and $A^3$ may be substituted with a halogen atom (such as a fluorine atom, a bromine atom, and an iodine atom), an oxygen atom, a nitrogen atom or the like, and is preferably not substituted.

Examples of the acyl group represented by $A^1$, $A^2$ and $A^3$ include a formyl group, an acetyl group, a propionyl group, a butyryl group (butanoyl group), a propenoyl group, a hexanoyl group, or the like. Among the above examples of the acyl group, the acyl group is more preferably an acyl group having 2 to 4 carbon atoms, and still more preferably an acyl group having 2 or 3 carbons, from the viewpoint of moldability in the resin composition and of preventing squeaking noises in the resin molded article.

Examples of the cellulose acylate (A) include cellulose acetate (cellulose monoacetate, cellulose diacetate (DAC), cellulose triacetate), cellulose acetate propionate (CAP), cellulose acetate butyrate (CAB), or the like.

The cellulose acylate (A) is preferably cellulose acetate propionate (CAP) and cellulose acetate butyrate (CAB), and is more preferably cellulose acetate propionate (CAP), from the viewpoint of preventing squeaking noises in the resin molded article.

One kind of cellulose acylate (A) may be used alone, or two or more kinds of cellulose acylate (A) may be used in combination.

A weight-average polymerization degree of the cellulose acylate (A) is preferably 200 to 1,000, more preferably 500 to 1,000, and still more preferably 600 to 1,000, from the viewpoint of moldability in the resin composition and of preventing squeaking noises in the resin molded article.

The weight-average polymerization degree of the cellulose acylate (A) is determined from a weight average molecular weight (Mw) by the following procedure.

First, the weight average molecular weight (Mw) of the cellulose acylate (A) in terms of polystyrene is measured by a gel permeation chromatography apparatus (GPC apparatus: HLC-8320 GPC, manufactured by TOSOH CORPORATION, column: TSK gel α-M) using tetrahydrofuran.

Next, the weight average molecular weight (Mw) of the cellulose acylate (A) is divided by a constitutional unit molecular weight of the cellulose acylate (A) to determine the polymerization degree thereof. For example, in a case where a substituent of the cellulose acylate is an acetyl group, the constituent unit molecular weight is 263 when the degree of substitution is 2.4, and is 284 when the degree of substitution is 2.9.

The degree of substitution of the cellulose acylate (A) is preferably 2.1 to 2.9, more preferably 2.2 to 2.9, still more preferably 2.3 to 2.9, and particularly preferably 2.6 to 2.9, from the viewpoint of moldability in the resin composition and of preventing squeaking noises in the resin molded article.

In the cellulose acetate propionate (CAP), the ratio of the degree of substitution of the acetyl group to that of the propionyl group (acetyl group/propionyl group) is preferably 0.01 to 1, and more preferably 0.05 to 0.1, from the viewpoint of moldability in the resin composition and of preventing squeaking noises in the resin molded article.

The CAP preferably satisfies the following (1), (2), (3), and (4), more preferably satisfies the following (1), (3), and (4), and still more preferably satisfies the following (2), (3), and (4). (1) When the CAP is measured by a GPC method using tetrahydrofuran as a solvent, the weight average molecular weight (Mw) in terms of polystyrene is 160,000 to 250,000, and a ratio of a number average molecular weight (Mn) in terms of polystyrene to a Z-average molecular weight (Mz) in terms of polystyrene (Mn/Mz) is 0.14 to 0.21. (2) When the CAP is measured by a GPC method using tetrahydrofuran as a solvent, the weight-average molecular weight (Mw) in terms of polystyrene is 160,000 to 250,000, a ratio of the number average molecular weight (Mn) in terms of polystyrene to the Z-average molecular weight (Mz) in terms of polystyrene (Mn/Mz) is 0.14 to 0.21, and a ratio of the weight average molecular weight (Mw) in terms of polystyrene to the Z-average molecular weight (Mz) (Mw/Mz) in terms of polystyrene is 0.3 to 0.7. (3) When the CAP is measured by capillography at 230° C. in accordance with ISO 11443: 1995, a ratio of a viscosity η1 (Pa s) at a shear rate of 1216 (/sec) to a viscosity η2 (Pa s) at a shear rate of 121.6 (/sec) (η1/η2) is 0.1 to 0.3. (4) When a small square plate test piece (D11 test piece specified by JIS K7139: 2009, 60 mm×60 mm, thickness 1 mm) obtained by injection molding of the CAP is left for 48 hours in an atmosphere at a temperature of 65° C. and a relative humidity of 85%, both an expansion coefficient in a MD direction and an expansion coefficient in a TD direction are 0.4% to 0.6%. Here, the MD direction refers to a length direction of a cavity of a mold used for injection molding, and the TD direction refers to a direction orthogonal to the MD direction.

In the cellulose acetate butyrate (CAB), the ratio of the degree of substitution of the acetyl group to the butyryl group (acetyl group/butyryl group) is preferably 0.05 to 3.5, and more preferably 0.5 to 3.0, from the viewpoint of moldability in the resin composition and of preventing squeaking noises in the resin molded article.

The degree of substitution of the cellulose acylate (A) is an index showing the degree to which the hydroxy group of cellulose is substituted with the acyl group. That is, the degree of substitution is an index showing a degree of acylation of the cellulose acylate (A). Specifically, the degree of substitution refers to an intramolecular average of the number of substitution in which three hydroxy groups in a D-glucopyranose unit of the cellulose acylate are substituted with acyl groups. The degree of substitution is determined from an integral ratio of the cellulose-derived hydrogen and the acyl group-derived peak based on $^1$H-NMR (JMN-ECA/manufactured by JEOL RESONANCE).

[Polymer (B): Component B]

The component B is at least one polymer selected from the group consisting of: a polymer (b1) having a core-shell structure that includes a core layer containing a butadiene polymer, and a shell layer that is located on a surface of the core layer and contains a polymer selected from a styrene polymer and an acrylonitrile-styrene polymer; a styrene-ethylene-butadiene-styrene copolymer (b2); polyurethane (b3); and aromatic polyester (b4).

The component (B) is, for example, a thermoplastic elastomer having elasticity at ordinary temperature (25° C.), and having the same softening property as thermoplastic resin at a high temperature.

(Polymer (b1) Having a Core-Shell Structure: Component (b1))

The polymer (b1) having a core-shell structure includes a core layer and a shell layer on the surface of the core layer.

The polymer (b1) having a core-shell structure is a polymer in which the core layer is set as an innermost layer and the shell layer is set as an outermost layer (specifically, a polymer in which the shell layer is obtained by graft-polymerizing a styrene polymer or an acrylonitrile-styrene polymer on the core layer containing a butadiene polymer).

One or more other layers (such as 1 to 6 other layers) may be provided between the core layer and the shell layer. In a case where other layers are provided, the polymer (b1) having a core-shell structure is a polymer in which a plurality of polymers are graft-polymerized to form a multilayered polymer on a polymer to be the core layer.

The core layer containing the butadiene polymer is not particularly limited as long as the butadiene polymer is obtained by polymerizing components containing butadiene. The core layer may contain a homopolymer of butadiene, or may contain a copolymer of butadiene and other monomers. In the case where the core layer is a copolymer of butadiene and other monomers, examples of other monomers include vinyl aromatic series. The vinyl aromatic series are preferably styrene components (such as styrene, alkyl-substituted styrene (such as α-methylstyrene, 2-methylstyrene, 3-methylstyrene, 4-methylstyrene, 2-ethylstyrene, 3-ethylstyrene, and 4-ethylstyrene), and halogen-substituted styrene (such as 2-chlorostyrene, 3-chlorostyrene, and 4-chlorostyrene)). One kind of styrene component may be used alone, or two or more kinds of styrene components may be used in combination. Among the styrene components, styrene is preferably used. In addition, polyfunctional monomers such as allyl (meth) acrylate, triallyl isocyanurate, and divinylbenzene may be used as other monomers.

Specifically, the core layer containing the butadiene polymer may be, for example, a homopolymer of butadiene, a copolymer of butadiene and styrene, and a terpolymer of butadiene, styrene and divinylbenzene.

The butadiene polymer contained in the core layer preferably contains 60 mass % to 100 mass % (preferably 70 mass % to 100 mass %) of constitutional units derived from butadiene, and 0 mass % to 40 mass % (preferably 0 mass % to 30 mass %) of constitutional units derived from other monomers (preferably styrene components). For example, the proportion of the constitutional units which are derived from each monomer constituting the butadiene polymer preferably satisfies the followings: for each monomer, the content of butadiene is 60 mass % to 100 mass %; the content of styrene is 0 mass % to 40 mass %; and the content of divinylbenzene is preferably 0% to 5%, based on the total amount of styrene and divinylbenzene.

The shell layer containing the styrene polymer is not particularly limited as long as the shell layer contains a polymer obtained by polymerizing styrene components. The shell layer may contain a homopolymer of styrene, or may contain a copolymer of styrene and other monomers. Examples of the styrene component include components similar to the styrene component exemplified in the core layer. Examples of other monomers include alkyl (meth) acrylates (such as methyl (meth) acrylate, ethyl (meth) acrylate, n-propyl (meth) acrylate, n-butyl (meth) acrylate, n-hexyl (meth) acrylate, 2-ethylhexyl (meth) acrylate, cyclohexyl (meth) acrylate, and octadecyl (meth) acrylate), or the like. In the alkyl (meth) acrylate, at least a part of hydrogen of the alkyl chain may be substituted. Examples of the substituent of the hydrogen include an amino group, a hydroxy group, a halogen group, or the like. One kind of alkyl (meth) acrylate may be used alone, or two or more kinds of alkyl (meth) acrylate may be used in combination. In addition, polyfunctional monomers such as allyl (meth) acrylate, triallyl isocyanurate, and divinylbenzene may be used as other monomers. The styrene polymer contained in the shell layer is preferably a copolymer in which the content of the styrene component is 85 mass % to 100 mass %, and the content of other monomer components (preferably, alkyl (meth) acrylate) is 0 mass % to 15 mass %.

Among styrene polymers, the styrene polymer contained in the shell layer is preferably a copolymer of styrene and alkyl (meth) acrylate, from the viewpoint of preventing squeaking noises in the resin molded article. From the similar point, a copolymer of styrene and alkyl (meth) acrylate having 1 to 8 carbon atoms in an alkyl chain is preferred, and a polymer of alkyl (meth) acrylate having 1 to 4 carbon atoms in an alkyl chain is more preferred.

The shell layer containing an acrylonitrile-styrene polymer contains a copolymer of an acrylonitrile component and a styrene component. The acrylonitrile-styrene polymer is not particularly limited, and examples thereof include known acrylonitrile-styrene polymers. The acrylonitrile-styrene polymer may be, for example, a copolymer of 10 mass % to 80 mass % of the acrylonitrile component and 20 mass % to 90 mass % of the styrene component. Examples of the styrene component copolymerized with the acrylonitrile component include components similar to the styrene component exemplified in the core layer. In addition, polyfunctional monomers such as allyl (meth) acrylate, triallyl isocyanurate, and divinylbenzene may also be used for the acrylonitrile-styrene polymer contained in the shell layer.

One or more other layers between the core layer and the shell layer include the layer including the polymer described in the shell layer.

The content of the polymer in the shell layer is preferably 1 mass % to 40 mass %, more preferably 3 mass % to 30 mass %, and still more preferably 5 mass % to 15 mass %, based on the entire polymer having a core-shell structure.

Among components (b1), examples of commercially available products of the polymer (b1) having a core-shell structure that includes a core layer containing a butadiene polymer and a shell layer containing a styrene polymer on the surface of the core layer include "METABLEN" (registered trademark) manufactured by MITSUBISHI CHEMICAL CORPORATION, "KANE ACE" (registered trademark) manufactured by KANEKA CORPORATION, "CLEARSTRENGTH" (registered trademark) manufactured by ARKEMA, and "PARALOID" (registered trademark) manufactured by DOW CHEMICAL JAPAN.

In addition, among components (b1), examples of commercially available products of the polymer (b1) having a core-shell structure that includes a core layer containing a butadiene polymer and a shell layer containing an acrylonitrile-styrene polymer on the surface of the core layer include "BLENDEX" (registered trademark) manufactured by GALATA CHEMICALS, Inc., "ELIX" manufactured by ELIX POLYMERS, or the like.

An average primary particle diameter of the polymer (b1) having a core-shell structure is not particularly limited, and is preferably 50 nm to 500 nm, more preferably 50 nm to 400 nm, still more preferably 100 nm to 300 nm, and particularly preferably 150 nm to 250 nm, from the viewpoint of preventing squeaking noises in the resin molded article.

The average primary particle diameter refers to a value measured by the following method. The average primary particle diameter is obtained by: observing particles with a scanning electron microscope; setting the maximum diameter of a primary particle as the primary particle diameter; and measuring primary particle diameters of 100 particles, and averaging the total value of the primary particle diameters. Specifically, the average primary particle diameter is determined by observing a dispersion form of the polymer having a core-shell structure in the resin composition with the scanning electron microscope.

(Styrene-Ethylene-Butadiene-Styrene Copolymer (b2): Component (b2))

The copolymer (b2) is not particularly limited as long as the copolymer (b2) is a thermoplastic elastomer, and examples thereof include a known styrene-ethylene-butadiene-styrene copolymer. The copolymer (b2) may be a styrene-ethylene-butadiene-styrene copolymer and a hydrogenated product thereof.

The copolymer (b2) is preferably the hydrogenated product of the styrene-ethylene-butadiene-styrene copolymer, from the viewpoint of preventing squeaking noises in the resin molded article. In addition, from the similar point, the copolymer (b2) may be a block copolymer, for example, preferably a copolymer (styrene-ethylene/butylene-styrene triblock copolymer) including blocks at both ends containing styrene moieties, and a center block containing ethylene/butylene moieties, obtained by hydrogenating at least a part of double bonds of butadiene moieties. The ethylene/butylene block moiety of the styrene-ethylene/butylene-styrene copolymer may be a random copolymer.

The copolymer (b2) may be obtained by a known method. In a case where the copolymer (b2) is the hydrogenated product of the styrene-ethylene-butadiene-styrene copolymer, for example, the copolymer (b2) may be obtained by hydrogenating the butadiene moiety of a styrene-butadiene-styrene block copolymer in which a conjugated diene portion is constituted of 1,4 bonds.

Examples of commercially available products of the copolymer (b2) include "KRATON" (registered trademark) manufactured by CLAYTON CO., LTD., "SEPTON" (registered trademark) manufactured by Kuraray Co., Ltd., or the like.

(Polyurethane (b3): Component (b3))

The polyurethane (b3) is not particularly limited as long as the polyurethane (b3) is a thermoplastic elastomer, and examples thereof include known polyurethane. The polyurethane (b3) is preferably a linear polyurethane. The polyurethane (b3) is obtained by making, for example, a polyol component (polyether polyol, polyester polyol, polycarbonate polyol, or the like) react with an organic isocyanate component (aromatic diisocyanate, aliphatic (including alicyclic) diisocyanate, or the like), and with a chain extender (aliphatic (including alicyclic) diol or the like) if necessary. One kind of the polyol component and of the organic isocyanate component may be used alone respectively, or two or more kinds of the polyol component and of the organic isocyanate component may be used in combination.

The polyurethane (b3) is preferably aliphatic polyurethane from the viewpoint of preventing squeaking noises in the resin molded article. The aliphatic polyurethane is preferably obtained by making, for example, a polyol component containing polycarbonate polyol react with an isocyanate component containing aliphatic diisocyanate.

For example, the polyol component may react with an organic isocyanate component to obtain the polyurethane (b3) by setting a value of the NCO/OH ratio of the raw materials in the synthesis of polyurethane to be in a range of 0.90 to 1.5. The polyurethane (b3) may be obtained by a known method such as a one-shot method, and a pre-polymerization method.

Examples of commercially available products of the polyurethane (b3) include "ESTANE" (registered trademark) manufactured by LUBRIZOL CORPORATION, "ELASTOLLAN" (registered trademark) manufactured by BASF, or the like. "DESMOPAN" (registered trademark) manufactured by BAYER CORPORATION may also be mentioned.

(Aromatic Polyester (b4): Component (b4))

The aromatic polyester (b4) is not particularly limited as long as the aromatic polyester (b4) is a thermoplastic elastomer, and examples thereof include known polyester. In the exemplary embodiment, the aromatic polyester represents polyester having an aromatic ring in a structure thereof.

Examples of the aromatic polyester (b4) include a polyester copolymer (polyether ester, polyester ester, or the like). Examples of the aromatic polyester (b4) specifically include: a polyester copolymer having a hard segment formed of a polyester unit and a soft segment formed of a polyester unit; a polyester copolymer having a hard segment formed of a polyester unit and a soft segment formed of a polyether unit; and a polyester copolymer having a hard segment formed of a polyester unit and a soft segment formed of a polyether unit and a polyester unit. The mass ratio of the hard segment to the soft segment of the polyester copolymer (hard segment/soft segment) is, for example, preferably 20/80 to 80/20. The polyester unit constituting the hard segment and the polyester unit and polyether unit constituting the soft segment may be either aromatic series or aliphatic series (including alicyclic series).

The polyester copolymer as the aromatic polyester (b4) may be obtained by a known method. The polyester copolymer is preferably linear. The polyester copolymer may be obtained by: a method of esterifying or transesterifying a dicarboxylic acid component having 4 to 20 carbon atoms, a diol component having 2 to 20 carbon atoms, and a polyalkylene glycol component having a number average molecular weight of 300 to 20,000 (containing an alkylene oxide adduct of the polyalkylene glycol); and a method of polycondensating oligomers that are produced by esterifying or transesterifying these components. In addition, for example, the method of esterifying or transesterifying the dicarboxylic acid component having 4 to 20 carbon atoms, the diol component having 2 to 20 carbon atoms, and an aliphatic polyester component having a number average molecular weight of 300 to 20,000 may be mentioned. The dicarboxylic acid component is an aromatic or aliphatic dicarboxylic acid or an ester derivative thereof. The diol component is an aromatic or aliphatic diol. The polyalkylene glycol component is an aromatic or aliphatic polyalkylene glycol.

Among these components, the dicarboxylic acid component having an aromatic ring is preferably used as the dicarboxylic acid component of the polyester copolymer, from the viewpoint of preventing squeaking noises in the resin molded article. In addition, the aliphatic diol component and the aliphatic polyalkylene glycol component are preferably used as the diol component and the polyalkylene glycol component, respectively.

Examples of commercially available products of the aromatic polyester (b4) include "PELPRENE" (registered trademark) manufactured by TOYOBO CO., LTD., and "HYTREL" (registered trademark) manufactured by DU PONT-TORAY CO., LTD.

[Plasticizer (C): Component (C)]

Examples of the plasticizer (C) include cardanol compounds, ester compounds, camphor, metal soaps, polyols, polyalkylene oxide, or the like. In the exemplary embodiment, the ester compound (e1) represented by the specific General Formula shown below as "other components (E)" is excluded from the ester compound as the plasticizer (C).

One kind of plasticizer (C) may be used alone, or two or more kinds of plasticizers (C) may be used in combination.

The plasticizer (C) is preferably at least one selected from cardanol compounds and ester compounds other than other components (E), from the viewpoint of preventing squeaking noises in the resin molded article. Cardanol compounds and ester compounds that are suitable as the plasticizer (C) will be specifically described below.

—Cardanol Compound—

The cardanol compound refers to a component (such as compounds represented by the following structural formulas (c-1) to (c-4)) contained in a naturally derived compound that is derived from cashews, or a derivative derived from the above-described component.

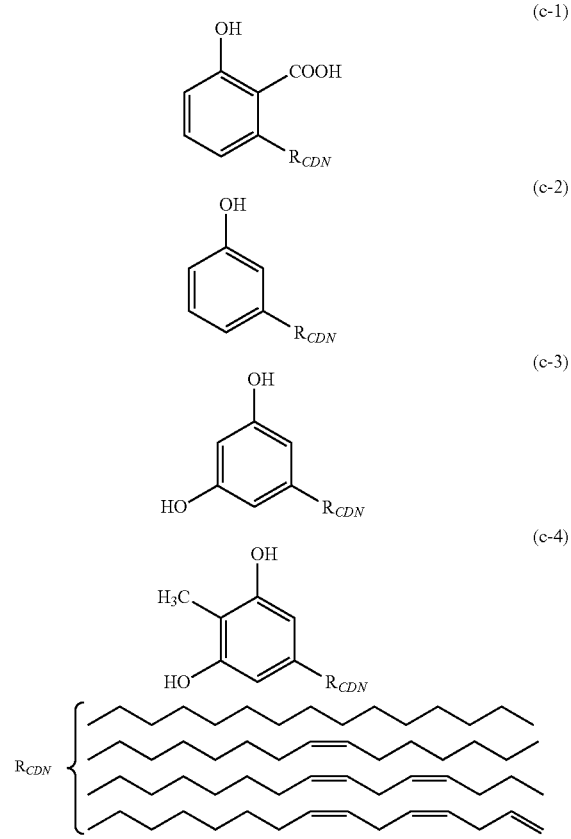

One kind of cardanol compound may be used alone, or two or more kinds of cardanol compounds may be used in combination.

The resin composition according to the exemplary embodiment may contain a mixture of naturally derived compounds that are derived from cashews (referred to as "cashew-derived mixture") as a cardanol compound.

The resin composition according to the exemplary embodiment may contain derivatives from the cashew-derived mixture as a cardanol compound. Examples of the derivatives from the cashew-derived mixture include the following mixtures, pure substances, or the like.

A mixture obtained by adjusting a composition ratio of each component in the cashew-derived mixture A pure substance obtained by only isolating a specific component from the cashew-derived mixture A mixture containing a modified product obtained by modifying components in the cashew-derived mixture A mixture containing a polymer obtained by polymerizing components in the cashew-derived mixture A mixture containing a modified polymer obtained by modifying and polymerizing components in the cashew-derived mixture A mixture containing a modified product obtained by further modifying components in the mixture whose composition ratio is adjusted A mixture containing a modified product obtained by further polymerizing components in the mixture whose the composition ratio is adjusted A mixture containing a modified polymer obtained by further modifying and polymerizing components in the mixture whose the composition ratio is adjusted A modified product obtained by further modifying the isolated pure substance A polymer obtained by further polymerizing the isolated pure substance A modified polymer obtained by further modifying and polymerizing the isolated pure substance Here, the pure substance includes a multimer such as a dimer and a trimer.

The cardanol compound is preferably at least a compound selected from the group consisting of a compound represented by a General Formula (CDN1) and a polymer obtained by polymerizing the compound represented by the General Formula (CDN1), from the viewpoint of preventing squeaking noises in the resin molded article.

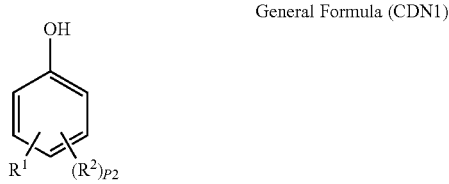

General Formula (CDN1)

In the General Formula (CDN1), $R^1$ represents an alkyl group that may have a substituent, or an unsaturated aliphatic group that has a double bond and may have a substituent. $R^2$ represents a hydroxy group, a carboxy group, an alkyl group that may have a substituent, or an unsaturated aliphatic group that has a double bond and may have a substituent. P2 represents an integer of 0 to 4. In a case where P2 is 2 or more, a plurality of $R^2$ may be the same group or different groups.

In the General Formula (CDN1), the alkyl group, which may have a substituent and is represented by the $R^1$, is preferably an alkyl group having 3 to 30 carbon atoms, more preferably an alkyl group having 5 to 25 carbon atoms, and still more preferably an alkyl group having 8 to 20 carbon atoms.

Examples of the substituent include: a hydroxy group; a substituent containing an ether bond such as an epoxy group and a methoxy group; a substituent containing an ester bond such as an acetyl group and a propionyl group; or the like.

Examples of the alkyl group that may have a substituent include pentadecan-1-yl, heptane-1-yl, octan-1-yl, nonan-1-yl, decan-1-yl, undecan-1-yl, dodecan-1-yl, tetradecan-1-yl, or the like.

In the General Formula (CDN1), the unsaturated aliphatic group represented by the $R^1$, which has a double bond and may have a substituent, is preferably an unsaturated aliphatic group having 3 to 30 carbon atoms, more preferably an unsaturated aliphatic group having 5 to 25 carbon atoms, and still more preferably an unsaturated aliphatic group having 8 to 20 carbon atoms.

The number of double bonds contained in the unsaturated aliphatic group is preferably 1 to 3.

The substituents of the unsaturated aliphatic group are similar to those of the alkyl group.

Examples of the unsaturated aliphatic group, which has a double bond and may have a substituent, include pentadeca-8-en-1-yl, pentadeca-8,11-diene-1-yl, pentadeca-8,11,14-trien-1-yl, pentadeca-7-en-1-yl, pentadeca-7,10-diene-1-yl, pentadeca-7,10,14-trien-1-yl, or the like.

In the General Formula (CDN1), $R^1$ is preferably pentadeca-8-en-1-yl, pentadeca-8,11-diene-1-yl, pentadeca-8,11,14-trien-1-yl, pentadeca-7-en-1-yl, pentadeca-7,10-diene-1-yl, pentadeca-7,10,14-trien-1-yl, or the like.

In the General Formula (CDN1), preferred examples of $R^2$, which represent the alkyl group that may have a substituent, and the unsaturated aliphatic group that has a double bond and may have a substituent, are similar to those which are recited as examples of $R^1$, which represent the alkyl group that may have a substituent, and the unsaturated aliphatic group that has a double bond and may have a substituent.

The compound represented by the General Formula (CDN1) may be further modified. For example, the CDN1 represented compound may be epoxidized. Specifically, the epoxidized product may be a compound having a structure in which a hydroxy group of the compound represented by the General Formula (CDN1) is replaced with the following group (EP), that is, a compound represented by the following General Formula (CDN1-e).

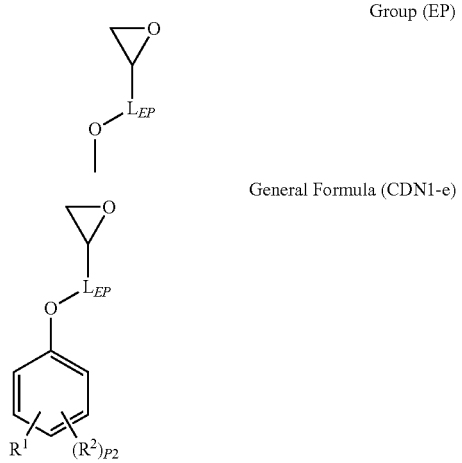

Group (EP)

General Formula (CDN1-e)

In the group (EP) and the General Formula (CDN1-e), $L_{EP}$ represents a single bond or a divalent linking group. The definitions of $R^1$, $R^2$ and P2 in the General Formula (CDN1-e) are respectively same as those of $R^1$, $R^2$ and P2 in the General Formula (CDN1).

In the group (EP) and the General Formula (CDN1-e), examples of the divalent linking group represented by $L_{EP}$ include an alkylene group that may have a substituent (preferably an alkylene group having 1 to 4 carbon atoms, and more preferably an alkylene group having 1 carbon atom), —CH$_2$CH$_2$OCH$_2$CH$_2$—, or the like.

Examples of the substituent are similar to those recited as the substituent in $R^1$ of the General Formula (CDN1).

$L_{EP}$ is preferably a methylene group.

The polymer obtained by polymerizing a compound represented by the General Formula (CDN1) refers to a polymer in which at least two compounds represented by the General Formula (CDN1) are polymerized with or without a linking group.

Examples of the polymer obtained by polymerizing the compound represented by the General Formula (CDN1) include a compound represented by the following General Formula (CDN2).

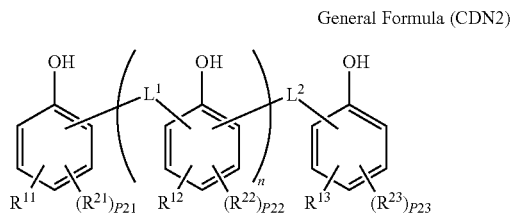

General Formula (CDN2)

In the General Formula (CDN2), $R^{11}$, $R^{12}$ and $R^{13}$ each independently represent an alkyl group that may have a substituent, or an unsaturated aliphatic group that has a double bond and may have a substituent. $R^{21}$, $R^{22}$, and $R^{23}$ each independently represent a hydroxy group, a carboxy group, an alkyl group that may have a substituent, or an unsaturated aliphatic group that has a double bond and may have a substituent. P21 and P23 each independently represent an integer of 0 to 3, and P22 represents an integer of 0 to 2. $L^1$ and $L^2$ each independently represent a divalent linking group. n represents an integer of 0 to 10. A plurality of $R^{21}$ in a case where P21 is 2 or more, a plurality of $R^{22}$ in a case where P22 is 2 or more, and a plurality of $R^{23}$ in a case where P23 is 2 or more, may be the same group or different groups, separately. In a case where n is 2 or more, a plurality of $R^{12}$, $R^{22}$, and $L^1$ may be the same group or different groups, separately. A plurality of P22 in a case where n is 2 or more each independently may be the same number or different numbers.

Preferred examples of $R^{11}$, $R^{12}$, $R^{13}$, $R^{21}$, $R^{22}$, and $R^{23}$ in the General Formula (CDN2), which represent alkyl groups that may have a substituent and unsaturated aliphatic groups that have a double bond and may have a substituent, are similar to those recited as the $R^1$ in the General Formula (CDN1).

Examples of the divalent linking group represented by $L^1$ and $L^2$ in the General Formula (CDN2) include an alkylene group that may have a substituent (preferably an alkylene group having 2 to 30 carbon atoms, and more preferably an alkylene group having 5 to 20 carbon atoms), or the like.

Examples of the substituent are similar to those recited as the substituent in $R^1$ of the General Formula (CDN1).

In the General Formula (CDN2), n is preferably 1 to 10, and more preferably 1 to 5.

The compound represented by the General Formula (CDN2) may be further modified. For example, the CDN2 represented compound may be epoxidized. Specifically, the epoxidized product may be a compound having a structure in which a hydroxy group of the compound represented by the General Formula (CDN2) is replaced with the group (EP), that is, a compound represented by the following General Formula (CDN2-e).

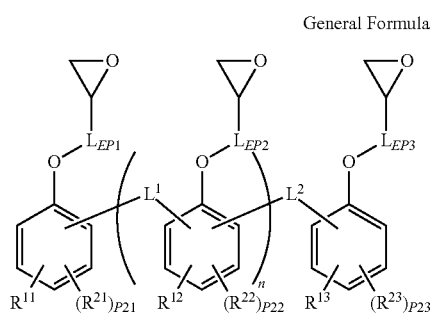

General Formula (CDN2-e)

The definitions of $R^{11}$, $R^{12}$, $R^{13}$, $R^{21}$, $R^{22}$, $R^{23}$, P21, P22, P23, $L^1$, $L^2$, and n in the General Formula (CDN2-e) are respectively same as those of $R^{11}$, $R^{12}$, $R^{13}$, $R^{21}$, $R^{22}$, $R^{23}$, P21, P22, P23, $L^1$, $L^2$, and n in the General Formula (CDN2).

In the General Formula (CDN2-e), $L_{EP1}$, $L_{EP2}$, and $L_{EP3}$ each independently represent a single bond or a divalent linking group. In a case where n is 2 or more, a plurality of $L_{EP2}$ may be the same group or different groups.

Preferred examples of divalent linking groups represented by $L_{EP1}$, $L_{EP2}$, and $L_{EP3}$ in the General Formula (CDN2-e) are similar to those recited as the divalent linking group represented by $L_{EP}$ in the General Formula (CDN1-e).

The polymer obtained by polymerizing the compound represented by the General Formula (CDN1) may be, for example, a polymer in which at least three or more compounds represented by the General Formula (CDN1) are three-dimensionally crosslinked and polymerized with or without a linking group. Examples of the polymer in which the compounds represented by the General Formula (CDN1) are three-dimensionally crosslinked and polymerized include a compound represented by the following structural formula.

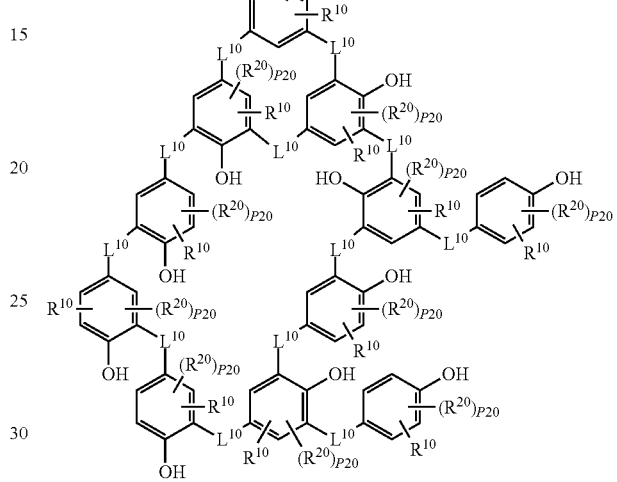

The definitions of $R^{10}$, $R^{20}$ and P20 in the structural formula are respectively same as those of $R^1$, $R^2$ and P2 in the General Formula (CDN1). $L^{10}$ represents a single bond or a divalent linking group. A plurality of $R^{10}$, $R^{20}$ and $L^{10}$ may be the same group or different groups, separately. A plurality of P20 may be the same number or different numbers.

Examples of the divalent linking group represented by $L^{10}$ in the structural formula include an alkylene group that may have a substituent (preferably an alkylene group having 2 to 30 carbon atoms, more preferably an alkylene group having 5 to 20 carbon atoms), or the like.

Examples of the substituent are similar to those recited as the substituent in $R^1$ of the General Formula (CDN1).

The compound represented by the structural formula may be further modified, and, for example, may be epoxidized. Specifically, the epoxidized product may be a compound having a structure in which a hydroxy group of the compound represented by the structural formula is replaced with a group (EP), for example, a compound represented by the following structural formula, that is, a polymer in which the compounds represented by the General Formula (CDN1-e) are three-dimensionally crosslinked and polymerized.

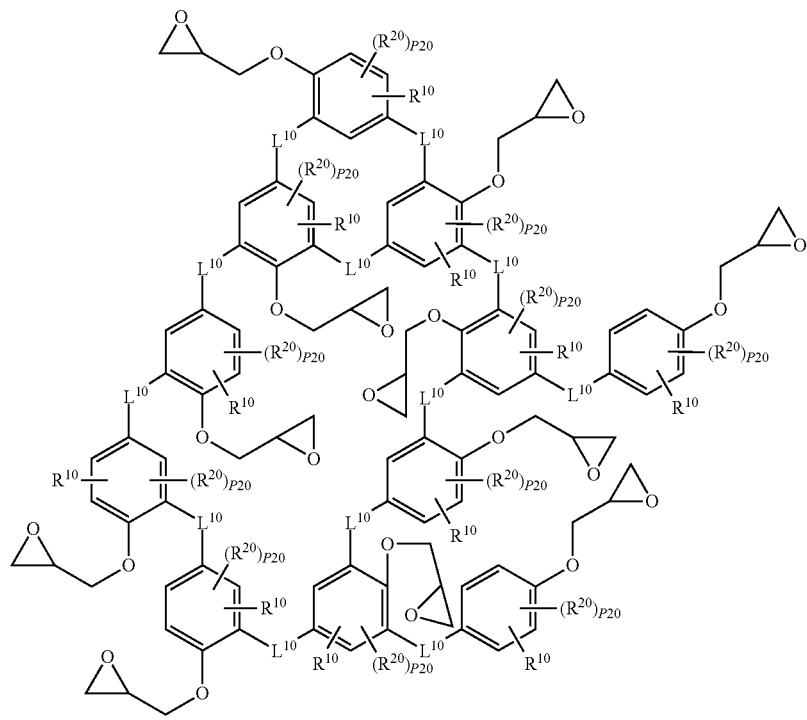

The definitions of $R^{10}$, $R^{20}$ and P20 in the structural formula are respectively same as those of $R^1$, $R^2$ and P2 in the General Formula (CDN1-e). $L^{10}$ represents a single bond or a divalent linking group. A plurality of $R^{10}$, $R^{20}$ and $L^{10}$ may be the same group or different groups, separately. A plurality of P20 may be the same number or different numbers.

Examples of the divalent linking group represented by $L^{10}$ in the structural formula include an alkylene group that may have a substituent (preferably an alkylene group having 2 to 30 carbon atoms, and more preferably an alkylene group having 5 to 20 carbon atoms), or the like.

Examples of the substituent are similar to those recited as the substituent in $R^1$ of the General Formula (CDN1).

The cardanol compound preferably contains a cardanol compound having an epoxy group, and is more preferably a cardanol compound having an epoxy group, from the viewpoint of preventing squeaking noises in the resin molded article.

A commercially available product may be used as the cardanol compound. Examples of commercially available products include NX-2024, Ultra LITE 2023, NX-2026, GX-2503, NC-510, LITE 2020, NX-9001, NX-9004, NX-9007, NX-9008, NX-9201, NX-9203, which are manufactured by CARDOLITE CORP., LB-7000, LB-7250, CD-5L, which are manufactured by TOHOKU CHEMICAL INDUSTRIES, LTD., or the like.

Examples of commercially available products of the cardanol compound having an epoxy group include NC-513, NC-514S, NC-547, LITE 513 E, Ultra LTE 513, or the like manufactured by CARDOLITE CORP.

The hydroxy value of the cardanol compound is preferably 100 mg KOH/g or more, more preferably 120 mg KOH/g or more, and still more preferably 150 mg KOH/g or more, from the viewpoint of preventing squeaking noises in the resin molded article. The hydroxy value of the cardanol compound is measured according to the A method of ISO 14900.

In a case where a cardanol compound having an epoxy group is used as the cardanol compound, the epoxy equivalent of the cardanol compound is preferably 300 to 500, more preferably 350 to 480, and still more preferably 400 to 470, from the viewpoint of preventing squeaking noises in the resin molded article. The epoxy equivalent of the cardanol compound having an epoxy group is measured in accordance with ISO3001.

The molecular weight of the cardanol compound is preferably 250 to 1,000, more preferably 280 to 900, and still more preferably 300 to 800, from the viewpoint of preventing squeaking noises in the resin molded article.

—Ester Compound—

An ester compound contained as the plasticizer (C) in the resin composition according to the exemplary embodiment is not particularly limited as long as the ester compound is an ester compound other than the compounds represented by General Formulas (1) to (5) below.

Examples of the ester compound contained as the plasticizer (C) include a dicarboxylic diester, a citrate, a polyether ester compound, glycol benzoate, a compound represented by the following General Formula (6), an epoxidized fatty acid ester, or the like. Examples of the above ester include a monoester, a diester, a triester, a polyester, or the like.

General Formula (6)

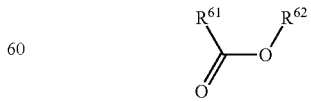

In the General Formula (6), $R^{61}$ represents an aliphatic hydrocarbon group having 7 to 28 carbon atoms, and $R^{62}$ represents an aliphatic hydrocarbon group having 1 to 8 carbon atoms.

Specific forms and preferred forms of a group represented by $R^{61}$ are similar to those of the group represented by $R^{11}$ in General Formula (1).

The group represented by $R^{62}$ may be a saturated aliphatic hydrocarbon group, or an unsaturated aliphatic hydrocarbon group, and is preferably a saturated aliphatic hydrocarbon group. The group represented by $R^{62}$ may be a linear aliphatic hydrocarbon group, a branched aliphatic hydrocarbon group, or an aliphatic hydrocarbon group containing an alicyclic group, and is preferably a branched aliphatic hydrocarbon group. The group represented by $R^{62}$ may be a group obtained by substituting a hydrogen atom in the aliphatic hydrocarbon group with a halogen atom (such as a fluorine atom, a bromine atom, and an iodine atom), an oxygen atom, a nitrogen atom, or the like, and is preferably an aliphatic hydrocarbon group whose hydrogen atom is not substituted. The group represented by $R^{62}$ has preferably 2 or more carbon atoms, more preferably 3 or more carbon atoms, and still more preferably 4 or more carbon atoms.

Specific examples of the ester compound contained as the plasticizer (C) include adipates, citrates, sebacates, azelates, phthalates, acetates, dibasiates, phosphates, condensed phosphates, glycol esters (such as glycol benzoate), modified products of fatty acid esters (such as epoxidized fatty acid esters), or the like. Examples of the esters include a monoester, a diester, a triester, a polyester, or the like. Among these esters, dicarboxylic acid diesters (such as adipic acid diesters, sebacic acid diesters, azelaic acid diesters, and phthalic acid diesters) are preferred.

The ester compound contained as the plasticizer (C) in the resin composition according to the exemplary embodiment has preferably a molecular weight (or a weight average molecular weight) of 200 to 2,000, more preferably 250 to 1,500, and still more preferably 280 to 1,000. The weight average molecular weight of the ester compound is a value measured in accordance with the method of measuring the weight average molecular weight of the cellulose acylate (A), unless otherwise specified.

The plasticizer (C) is preferably adipate. The adipate has a high affinity with the cellulose acylate (A), and disperses in a state substantially uniform to the cellulose acylate (A), so that the thermal fluidity of the adipate is further improved as compared with other plasticizers (C).

Examples of the adipate include an adipic acid diester and an adipic acid polyester. Specific examples include an adipic acid diester represented by the following General Formula (AE) and adipic acid polyester represented by the following General Formula (APE).

In the General Formula (AE), $R^{AE1}$ and $R^{AE2}$ each independently represent an alkyl group or a polyoxyalkyl group $[—(C_xH_{2x}—O)_y—R^{41}]$ (Here, $R^{41}$ represents an alkyl group, x represents an integer of 1 to 10, and y represents an integer of 1 to 10).

In the General Formula (APE), $R^{AE1}$ and $R^{AE2}$ each independently represent an alkyl group or a polyoxyalkyl group $[—(C_xH_{2x}—O)_y—R^{41}]$ (Here, $R^{41}$ represents an alkyl group, x represents an integer of 1 to 10, and y represents an integer of 1 to 10), and $R^{AE3}$ represents an alkylene group. m1 represents an integer of 1 to 10, and m2 represents an integer of 1 to 20.

In the General Formulas (AE) and (APE), the alkyl group represented by $R^{AE1}$ and $R^{AE2}$ is preferably an alkyl group having 1 to 12 carbon atoms, more preferably an alkyl group having 4 to 10 carbon atoms, and still more preferably an alkyl group having 8 carbon atoms. The alkyl group represented by $R^{AE1}$ and $R^{AE2}$ may be linear, branched or cyclic, and is preferably linear or branched.

In the polyoxyalkyl group $[—(C_xH_{2x}—O)_y—R^{41}]$ represented by $R^{AE1}$ and $R^{AE2}$ in the General Formulas (AE) and (APE), the alkyl group represented by $R^{41}$ is preferably an alkyl group having 1 to 6 carbon atoms, and more preferably an alkyl group having 1 to 4 carbon atoms. The alkyl group represented by $R^{41}$ may be linear, branched or cyclic, and is preferably linear or branched.

In the General Formula (APE), the alkylene group represented by $R^{AE3}$ is preferably an alkylene group having 1 to 6 carbon atoms, and more preferably an alkylene group having 1 to 4 carbon atoms. The alkylene group may be linear, branched or cyclic, and is preferably linear or branched.

In the General Formula (APE), m1 is preferably an integer of 1 to 5, and m2 is preferably an integer of 1 to 10.

In the General Formulas (AE) and (APE), the group represented by each symbol may be substituted with a substituent. Examples of the substituent include an alkyl group, an aryl group, a hydroxy group, or the like.

The molecular weight (or the weight average molecular weight) of the adipate is preferably 250 to 2,000, more preferably 280 to 1,500, and still more preferably 300 to 1,000. The weight average molecular weight of the adipate is a value measured in accordance with the method of measuring the weight average molecular weight of the cellulose acylate (A).

A mixture of adipate and other components may be used as the adipate. Examples of commercially available products

[Chem 11]

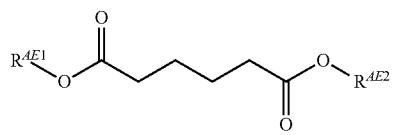

General Formula (AE)

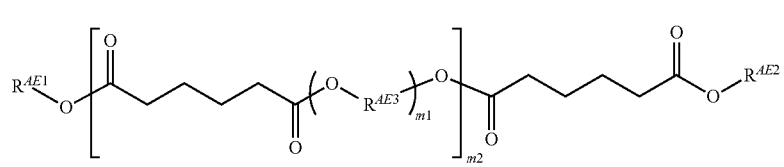

General Formula (APE)

of the mixture include Daifatty 101 manufactured by DAI-HACHI CHEMICAL INDUSTRY CO., LTD.

The hydrocarbon group at the end of a fatty acid ester such as citrate, sebacate, azelate, phthalate, and acetate is preferably an aliphatic hydrocarbon group, and is preferably an alkyl group having 1 to 12 carbon atoms, more preferably an alkyl group having 4 to 10 carbon atoms, and still more preferably an alkyl group having 8 carbon atoms. The alkyl group may be linear, branched or cyclic, and is preferably linear or branched.

Examples of the fatty acid esters such as citrates, sebacates, azelates, phthalates, and acetates include an ester formed of a fatty acid and an alcohol. Examples of the alcohol include: monohydric alcohols such as methanol, ethanol, propanol, butanol, and 2-ethylhexanol; polyhydric alcohols such as glycerin, a polyglycerol (diglycerin, or the like), pentaerythritol, ethylene glycol, diethylene glycol, propylene glycol, butylene glycol, trimethylolpropane, trimethylolethane, and a sugar alcohol; or the like.

Examples of the glycol in the glycol benzoate include ethylene glycol, diethylene glycol, propylene glycol, or the like.

The epoxidized fatty acid ester is an ester compound having a structure (that is, oxacyclopropane) in which a carbon-carbon unsaturated bond of an unsaturated fatty acid ester is epoxidized. Examples of the epoxidized fatty acid ester include an ester formed of an alcohol and a fatty acid in which a part or all of carbon-carbon unsaturated bonds of an unsaturated fatty acid (such as oleic acid, palmitoleic acid, vaccenic acid, linoleic acid, linolenic acid, and nervonic acid) are epoxidized. Examples of the alcohol include: monohydric alcohols such as methanol, ethanol, propanol, butanol, and 2-ethylhexanol; polyhydric alcohols such as glycerin, a polyglycerol (diglycerin, or the like), pentaerythritol, ethylene glycol, diethylene glycol, propylene glycol, butylene glycol, trimethylolpropane, trimethylolethane, and a sugar alcohol; or the like.

Examples of the commercially available products of the epoxidized fatty acid esters include ADK CIZER D-32, D-55, O-130P, and O-180A (manufactured by ADEKA), and SANSOSAIZA E-PS, nE-PS, E-PO, E-4030, E-6000, E-2000H, and E-9000H (manufactured by NEW JAPAN CHEMICAL CO., LTD.).

Each of polyester units and polyether units in the polyether ester compound may be either aromatic series or aliphatic series (containing alicyclic series). The mass ratio of the polyester units to the polyether units is, for example, 20:80 to 80:20. The molecular weight (or the weight average molecular weight) of the polyether ester compound is preferably 250 to 2,000, more preferably 280 to 1,500, and still more preferably 300 to 1,000. Examples of commercially available products of the polyether ester compound include ADK CIZER RS-1000 (ADEKA).

The polyether ester compound having 1 or more unsaturated bonds in the molecule thereof is exemplified by a polyether ester compound having an allyl group at the end thereof, which is preferably polyalkylene glycol allyl ether. The molecular weight (or the weight average molecular weight) of the polyether ester compound having 1 or more unsaturated bonds in the molecule thereof, is preferably 250 to 2,000, more preferably 280 to 1,500, and still more preferably 300 to 1,000. Examples of commercially available products of the polyether ester compound having 1 or more unsaturated bonds in the molecule thereof include polyalkylene glycol allyl ether such as UNIOX PKA-5006, UNIOX PKA-5008, UNIOL PKA-5014, UNIOL PKA-5017 (NOF CORPORATION).

(Aliphatic Polyester (D): Component (D))

The aliphatic polyester (D) is, for example, a polymer of hydroxyalkanoate (hydroxyalkanoic acid), a polycondensate of a polyvalent carboxylic acid and a polyhydric alcohol, a ring-opening polycondensate of a cyclic lactam, or the like.

Examples of the aliphatic polyester resin (D) include a polyhydroxyalkanoate (a polymer of hydroxyalkanoate), a polycondensate of an aliphatic diol and an aliphatic carboxylic acid, or the like.

Among the examples of the aliphatic polyester resin (D), polyhydroxyalkanoate is preferably used as the aliphatic polyester resin (D), from the viewpoint of preventing squeaking noises in the resin molded article.

One kind of aliphatic polyester resin (D) may be used alone, and two or more kinds of aliphatic polyester resins (D) may be used in combination.

Examples of polyhydroxyalkanoate include a compound having a structural unit represented by a General Formula (PHA).

In the compound having a structural unit represented by the General Formula (PHA), both ends of a polymer chain (ends of a main chain) may be a carboxyl group. Alternatively, only one end is a carboxyl group, and the other end may be other groups (such as a hydroxyl group).

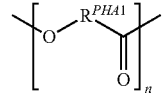

General Formula (PHA)

$R^{PHA1}$ in the General Formula (PHA) represents an alkylene group having 1 to 10 carbon atoms. n represents an integer of 2 or more.

The alkylene group represented by $R^{PHA1}$ in the General Formula (PHA) is preferably an alkylene group having 3 to 6 carbon atoms. The alkylene group represented by $R^{PHA1}$ may be either linear or branched, and is preferably branched.

Here, the expression that $R^{PHA1}$ represents an alkylene group in the General Formula (PHA) means that 1) a [O—$R^{PHA1}$—C(=O)—] structure is contained in PHA when $R^{PHA1}$ represents the same alkylene group; and 2) that a plurality of [O—$R^{PHA1}$—C(=O)—] structures (that is, [O—$R^{PHA1A}$—C(=O)—] and [O—$R^{PHA1B}$—C(=O)—] structures) are contained in PHA when $R^{PHA1}$ represents alkylene groups having different carbon atom numbers or different branches. That is, polyhydroxyalkanoate may be a homopolymer of one kind of polyhydroxyalkanoate (hydroxyalkanoic acid), or may be a copolymer of two kinds or more of polyhydroxyalkanoate (hydroxyalkanoic acid).

In the General Formula (PHA), the upper limit of n is not particularly limited, and examples thereof include 20,000 or less. The range of n is preferably from 500 to 10,000, and more preferably from 1,000 to 8,000.

Examples of the polyhydroxyalkanoate include a homopolymer of a hydroxyalkanoic acid (such as lactic acid, 2-hydroxybutyric acid, 3-hydroxybutyric acid, 4-hydroxybutyric acid, 2-hydroxy-3-methylbutyric acid, 2-hydroxy-3,3-dimethylbutyric acid, 3-hydroxyvaleric acid, 4-hydroxyvaleric acid, 5-hydroxyvaleric acid, 3-hydroxyhexanoic acid, 2-hydroxyhexanoic acid, 2-hydroxyisohexanoic acid, 6-hydroxyhexanoic acid, 3-hydroxypropionic acid, 3-hydroxy-2,2-dimethylpropionic acid, 3-hydroxyhexanoic acid, and 2-hydroxy-n-octanoic acid), or a copolymer of these 2 or more hydroxyalkanoic acids.

Among these examples of the polyhydroxyalkanoate, the polyhydroxyalkanoate may be preferably a homopolymer of a branched hydroxyalkanoic acid having 2 to 4 carbon atoms or a homocopolymer of a branched hydroxyalkanoic acid having 2 to 4 carbon atoms and a branched hydroxyalkanoic acid having 5 to 7 carbon atoms, more preferably a homopolymer of a branched hydroxyalkanoic acid having 3 carbon atoms (that is, polylactic acid) or a homocopolymer of 3-hydroxybutyric acid and 3-hydroxyhexanoic acid (that is, polyhydroxybutyrate hexanoate), and still more preferably a homopolymer of a branched hydroxyalkanoic acid having 3 carbon atoms (that is, polylactic acid), from the viewpoint of preventing squeaking noises in the resin molded article.

The number of carbon atoms of the hydroxyalkanoic acid also includes the number of carbon atoms of the carboxyl group.

Polylactic acid is a polymer compound in which lactic acid is polymerized by an ester bond.

Examples of polylactic acid include a homopolymer of L-lactic acid, a homopolymer of D-lactic acid, a block copolymer containing a polymer of at least one of L-lactic acid and D-lactic acid, and a graft copolymer containing a polymer of at least one of L-lactic acid and D-lactic acid.

Examples of the "compound copolymerizable with L-lactic acid or D-lactic acid" include: polyvalent carboxylic acids and anhydrides thereof such as glycolic acid, dimethylglycolic acid, 3-hydroxybutyric acid, 4-hydroxybutyric acid, 2-hydroxypropanoic acid, 3-hydroxypropanoic acid, 2-hydroxyvaleric acid, 3-hydroxyvaleric acid, 4-hydroxyvaleric acid, oxalic acid, malonic acid, succinic acid, glutaric acid, adipic acid, pimelic acid, azelaic acid, sebacic acid, undecanedioic acid, dodecanedioic acid, and terephthalic acid; polyhydric alcohols such as ethylene glycol, diethylene glycol, triethylene glycol, 1,2-propanediol, 1,3-propanediol, 1,3-butanediol, 1,4-butanediol, 2,3-butanediol, 1,5-pentanediol, 1,6-hexanediol, 1,9-nonanediol, 3-methyl-1,5-pentanediol, neopentyl glycol, tetramethylene glycol, and 1,4-hexanedimethanol; polysaccharides such as cellulose; aminocarboxylic acids such as α-amino acid; hydroxy carboxylic acids such as 5-hydroxyvaleric acid, 2-hydroxycaproic acid, 3-hydroxycaproic acid, 4-hydroxycaproic acid, 5-hydroxycaproic acid, 6-hydroxycaproic acid, 6-hydroxymethylcaproic acid, and mandelic acid; cyclic esters such as glycolide, β-methyl-δ-valerolactone, γ-valerolactone, ε-caprolactone; or the like.

It is known that polylactic acid may be produced by: a lactide method using lactide; a direct polymerization method in which lactic acid is heated under reduced pressure in a solvent and is polymerized while water is removed; or the like.

In polyhydroxybutyrate hexanoate, the copolymerization ratio of 3-hydroxyhexanoic acid (3-hydroxyhexanoate) to a copolymer of 3-hydroxybutyric acid (3-hydroxybutyrate) and 3-hydroxyhexanoic acid (3-hydroxyhexanoate) is preferably 3 mol % to 20 mol %, more preferably 4 mol % to 15 mol %, and still more preferably 5 mol % to 12 mol %, from the viewpoint of preventing squeaking noises in the resin molded article.

In a method of measuring the copolymerization ratio of 3-hydroxyhexanoic acid (3-hydroxyhexanoate) to a copolymer of 3-hydroxybutyric acid (3-hydroxybutyrate) and 3-hydroxyhexanoic acid, the hexanoate ratio is calculated from the integral values of the peaks derived from hexanoate ends and butyrate ends using $^1$H-NMR.

The weight average molecular weight (Mw) of the aliphatic polyester resin (D) is preferably 10,000 to 1,000,000 (preferably 50,000 to 800,000, and more preferably 100,000 to 600,000), from the viewpoint of preventing squeaking noises in the resin molded article.

The weight average molecular weight (Mw) of the aliphatic polyester resin (D) is a value measured by gel permeation chromatography (GPC). Specifically, molecular weight measurement by GPC is performed by HLC-8320GPC which is used as a measurement apparatus and manufactured by TOSOH CORPORATION, in which a column/TSK gel GMHHR-M+TSK gel GMHHR-M (7.8 mm I. D.30 cm) manufactured by TOSOH CORPORATION and a chloroform solvent are used. The weight average molecular weight (Mw) is calculated from this measurement result by using a molecular weight calibration curve made according to a monodisperse polystyrene standard sample.

[Heat Deformation Temperature of Resin Composition]

The resin molded article obtained by molding the resin composition according to the exemplary embodiment satisfy at least one of the following conditions (1) and (2): (1) a heat deformation temperature measured in accordance with an ASTM D648-07 B method is 95° C. or less; and (2) a heat distortion temperature measured in accordance with an ISO 75-2 A method (2013) is 80° C. or less. The resin molded article preferably satisfies at least one of a condition that the heat distortion temperature in the condition (1) is 90° C. or less and a condition that the heat distortion temperature in the condition (2) is 85° C. or less, from the viewpoint of preventing squeaking noises in the resin molded article. Further, the resin molded article preferably satisfies at least one of a condition that the heat distortion temperature in the condition (1) is 85° C. or less and a condition that the heat distortion temperature in the condition (2) is 75° C. or less.

[Content or Content Ratio of Components (A) to (D)]

The resin composition according to the exemplary embodiment contains the component (A), the component (B) and the component (C), and contains the component (D) if necessary. A content or content ratio (all in terms of mass) of each component, in the resin composition according to the exemplary embodiment, is preferably within the following ranges, from the viewpoint of preventing squeaking noises in the resin molded article.

The abbreviation of each component is as follows.
Component (A)=Cellulose Acylate (A)
Component (B)=Polymer (B)
Component (C)=Plasticizer (C)
Component (D)=Aliphatic Polyester (D)

The content of the component (A) in the resin composition according to the exemplary embodiment is preferably 50 mass % or more, more preferably 60 mass % or more, and still more preferably 70 mass % or more, based on the total mass of the resin composition.

The content of the component (B) in the resin composition according to the exemplary embodiment is preferably 1 mass % to 20 mass %, more preferably 3 mass % to 15 mass %, and still more preferably 5 mass % to 10 mass %, based on the total mass of the resin composition.

The content of the component (C) in the resin composition according to the exemplary embodiment is preferably 1 mass % to 25 mass %, more preferably 3 mass % to 20 mass %, and still more preferably 5 mass % to 15 mass %, based on the total mass of the resin composition.

The content of the component (D) in the resin composition according to the exemplary embodiment is preferably 0 mass % to 20 mass %, more preferably 3 mass % to 15 mass %, and still more preferably 3 mass % to 10 mass %, based on the total mass of the resin composition.

The content ratio of the component (B) to the component (A) ((B)/(A)) is preferably 0.025 to 0.3, more preferably 0.05 to 0.2, and still more preferably 0.07 to 0.15.

The content ratio of the component (C) to the component (A) ((C)/(A)) is preferably 0.02 to 0.3, more preferably 0.03 to 0.2, and still more preferably 0.05 to 0.1.

The content ratio of the component (D) to the component (A) ((D)/(A)) is preferably 0.025 to 0.3, more preferably 0.05 to 0.2, and still more preferably 0.05 to 0.15.

[Other Components (E)]

The resin composition according to the exemplary embodiment may contain other components (E) (component (E)). In a case where the resin composition contains other components (E), the total content of all other components (E) may be 15 mass % or less, based on the total amount of the resin composition, and is preferably 10 mass % or less.

Examples of other components (E) include: a flame retardant, a compatibilizer, an oxidation inhibitor, a stabilizer, a releasing agent, a light stabilizer, a weathering agent, a colorant, a pigment, a modifier, an anti-drip agent, an antistatic agent, an anti-hydrolysis agent, a filler, a reinforcing agent (glass fiber, carbon fiber, talc, clay, mica, glass flake, milled glass, glass beads, crystalline silica, alumina, silicon nitride, aluminum nitride, boron nitride, or the like), an acid acceptor for preventing acetic acid release (oxides such as magnesium oxide and aluminum oxide; metal hydroxides such as magnesium hydroxide, calcium hydroxide, aluminum hydroxide, and hydrotalcite; calcium carbonate; talc; or the like), and a reactive trapping agent (such as an epoxy compound, an acid anhydride compound, and a carbodiimide), or the like. The content of other components is preferably 0 mass % to 5 mass %, based on the total mass of the resin composition. Here, "0 mass %" means that no other components are contained.

The resin composition according to the exemplary embodiment may contain other resins as other components (E) besides the component (A), the component (B), the component (C), and the component (D). However, in a case where other resins are contained, the content of other resins based on the total amount of the resin composition is preferably 5 mass % or less, and more preferably less than 1 mass %. It is more preferable that the other resin is not contained (that is, 0 mass %).

Examples of the other resin include commonly known thermoplastic resin, and specific examples thereof include: a polycarbonate resin; a polypropylene resin; a polyester resin; a polyolefin resin; a polyester carbonate resin; a polyphenylene ether resin; a polyphenylene sulfide resin; a polysulfone resin; a polyether sulfone resin; a polyarylene resin; a polyetherimide resin; a polyacetal resin; a polyvinyl acetal resin; a polyketone resin; a polyetherketone resin; a polyether ketone resin; a polyaryl ketone resin; a polyether nitrile resin; a liquid crystal resin; a polybenzimidazole resin; a polyparabanic acid resin; a vinyl based polymer or copolymer obtained by polymerizing or copolymerizing one or more vinyl monomers selected from the group consisting of an aromatic alkenyl compound, a methacrylic acid ester, an acrylic acid ester, and a vinyl cyanide compound; a diene-aromatic alkenyl compound copolymer; a vinyl cyanide-diene-aromatic alkenyl compound copolymer; an aromatic alkenyl compound-diene-cyanide vinyl-N-phenylmaleimide copolymer; a vinyl cyanide-(ethylene-diene-propylene (EPDM))-aromatic alkenyl compound copolymer; a thermoplastic elastomer containing an acrylic polymer; a vinyl chloride resin; a chlorinated vinyl chloride resin; or the like. One kind of these resins may be used alone, or two or more kinds of these resins may be used in combination.

In addition, examples of other components include an ester compound (e1) other than an ester compound used as the plasticizer described above.

The ester compound (e1) other than the ester compound used as the plasticizer (C) is at least one selected from the group consisting of a compound represented by the following General Formula (1), a compound represented by the following General Formula (2), a compound represented by the following General Formula (3), a compound represented by the following General Formula (4), and a compound represented by the following General Formula (5).

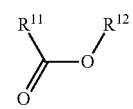

General Formula (1)

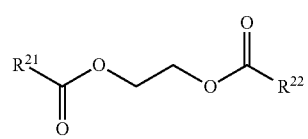

General Formula (2)

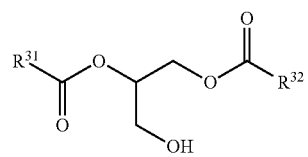

General Formula (3)

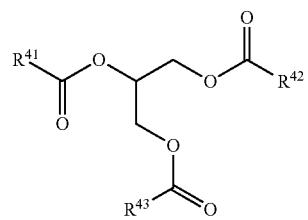

General Formula (4)

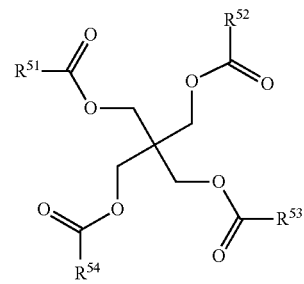

General Formula (5)

$R^{11}$ in the General Formula (1) represents an aliphatic hydrocarbon group having 7 to 28 carbon atoms. $R^{12}$ in the General Formula (1) represents an aliphatic hydrocarbon group having 9 to 28 carbon atoms.

$R^{21}$ and $R^{22}$ in the General Formula (2) each independently represent an aliphatic hydrocarbon group having 7 to 28 carbon atoms.

$R^{31}$ and $R^{32}$ in the General Formula (3) each independently represent an aliphatic hydrocarbon group having 7 to 28 carbon atoms.

$R^{41}$, $R^{42}$, and $R^{43}$ in the General Formula (4) each independently represent an aliphatic hydrocarbon group having 7 to 28 carbon atoms.

$R^{51}$, $R^{52}$, $R^{53}$, and $R^{54}$ in the General Formula (5) each independently represent an aliphatic hydrocarbon group having 7 to 28 carbon atoms.

$R^{11}$ represents an aliphatic hydrocarbon group having 7 to 28 carbon atoms. The group represented by $R^{11}$ is preferably an aliphatic hydrocarbon group having 9 or more carbon atoms, more preferably an aliphatic hydrocarbon group having 10 or more carbon atoms, and still more preferably an aliphatic hydrocarbon group having 15 or more carbon atoms, from the viewpoint that the group easily acts as a lubricant for the molecular chain of the resin (particularly, cellulose acylate (A), the similar applies hereinafter). The group represented by $R^{11}$ is preferably an aliphatic hydrocarbon group having 24 or less carbon atoms, more preferably an aliphatic hydrocarbon group having 20 or less carbon atoms, and still more preferably an aliphatic hydrocarbon group having 18 or less carbon atoms, from the viewpoint that the group easily enters between the molecular chains of the resin (particularly, cellulose acylate (A), the similar applies hereinafter). The group represented by $R^{11}$ is particularly preferably an aliphatic hydrocarbon group having 17 carbon atoms.

The group represented by $R^{11}$ may be a saturated aliphatic hydrocarbon group, or an unsaturated aliphatic hydrocarbon group. The group represented by $R^1$ is preferably a saturated aliphatic hydrocarbon group, from the viewpoint that the group easily enters between the molecular chains of the resin.

The group represented by $R^{11}$ may be a linear aliphatic hydrocarbon group, a branched aliphatic hydrocarbon group, or an aliphatic hydrocarbon group containing an alicyclic group. The group represented by $R^{11}$ is preferably an aliphatic hydrocarbon group containing an alicyclic group (that is, chain shaped aliphatic hydrocarbon group), and more preferably a linear aliphatic hydrocarbon group, from the viewpoint that the group easily enters between the molecular chains of the resin.

In a case where the group represented by $R^{11}$ is an unsaturated aliphatic hydrocarbon group, the group has preferably 1 to 3 unsaturated bonds, more preferably 1 or 2 unsaturated bonds, still more preferably 1 unsaturated bond, from the viewpoint that the group easily enters between the molecular chains of the resin.

In a case where the group represented by $R^{11}$ is an unsaturated aliphatic hydrocarbon group, the group has preferably a linear saturated hydrocarbon chain having 5 to 24 carbon atoms, more preferably a linear saturated hydrocarbon chain having 7 to 22 carbon atoms, still more preferably a linear saturated hydrocarbon chain having 9 to 20 carbon atoms, and particularly preferably a linear saturated hydrocarbon chain having 15 to 18 carbon atoms, from the viewpoint that the group easily enters between the molecular chains of the cellulose acylate (A) and easily acts as a lubricant for the molecular chain of cellulose acylate (A).

In a case where the group represented by $R^{11}$ is a branched aliphatic hydrocarbon group, the group has preferably 1 to 3 branched chains, more preferably 1 or 2 branched chains, still more preferably 1 branched chain, from the viewpoint that the group easily enters between the molecular chains of the resin.

In a case where the group represented by $R^{11}$ is a branched aliphatic hydrocarbon group, the main chain in the group is preferably a linear saturated hydrocarbon chain having 5 to 24 carbon atoms, more preferably a linear saturated hydrocarbon chain having 7 to 22 carbon atoms, still more preferably a linear saturated hydrocarbon chain having 9 to 20 carbon atoms, and particularly preferably a linear saturated hydrocarbon chain having 15 to 18 carbon atoms, from the viewpoint that the group easily enters between the molecular chains of the cellulose acylate (A) and easily acts as a lubricant for the molecular chain of cellulose acylate (A).

In a case where the group represented by $R^1$ is an aliphatic hydrocarbon group containing an alicyclic group, the group has preferably 1 or 2 alicyclic groups, and more preferably 1 alicyclic group, from the viewpoint that the group easily enters between the molecular chains of the resin.

In a case where the group represented by $R^1$ is an aliphatic hydrocarbon group containing an alicyclic group, the alicyclic group in the group is preferably an alicyclic group having 3 or 4 carbon atoms, and more preferably an alicyclic group having 3 carbon atoms, from the viewpoint that the group easily enters between the molecular chains of the resin.

The group represented by $R^{11}$ is preferably a linear saturated aliphatic hydrocarbon group, a linear unsaturated aliphatic hydrocarbon group, a branched saturated aliphatic group, or a branched unsaturated aliphatic hydrocarbon group, and particularly preferably a linear saturated aliphatic hydrocarbon group, from the viewpoint of preventing squeaking noises in the resin molded article. The preferred carbon number in these aliphatic hydrocarbon groups is as described above.

The group represented by $R^{11}$ may be a group obtained by substituting a hydrogen atom in the aliphatic hydrocarbon group with a halogen atom (such as a fluorine atom, a bromine atom, and an iodine atom), an oxygen atom, a nitrogen atom, or the like, and is preferably an aliphatic hydrocarbon group whose hydrogen atom is not substituted.

$R^{12}$ represents an aliphatic hydrocarbon group having 9 to 28 carbon atoms. Examples of the group represented by $R^{12}$ are similar to those of the group represented by $R^1$. The number of carbon atoms of the group represented by $R^{12}$ is preferably as follows.

The group represented by $R^{12}$ is preferably an aliphatic hydrocarbon group having 10 or more carbon atoms, more preferably an aliphatic hydrocarbon group having 11 or more carbon atoms, and still more preferably an aliphatic hydrocarbon group having 16 or more carbon atoms, from the viewpoint that the group easily acts as a lubricant for the molecular chain of the cellulose acylate (A). The group represented by $R^{12}$ is preferably an aliphatic hydrocarbon group having 24 or less carbon atoms, more preferably an aliphatic hydrocarbon group having 20 or less carbon atoms, and still more preferably an aliphatic hydrocarbon group having 18 or less carbon atoms, from the viewpoint that this group easily enters between the molecular chains of the resin. The group represented by $R^{12}$ is particularly preferably an aliphatic hydrocarbon group having 18 carbon atoms.

The group represented by $R^{12}$ is preferably a linear saturated aliphatic hydrocarbon group, a linear unsaturated aliphatic hydrocarbon group, a branched saturated aliphatic group, or a branched unsaturated aliphatic hydrocarbon group, and particularly preferably a linear saturated aliphatic hydrocarbon group, from the viewpoint of preventing squeaking noises in the resin molded article. The preferred carbon number in these aliphatic hydrocarbon groups is as described above.

The specific forms and preferred forms of the groups represented by $R^{21}$, $R^{22}$, $R^{31}$, $R^{32}$, $R^{41}$, $R^{42}$, $R^{43}$, $R^{51}$, $R^{52}$, $R^{53}$ and $R^{54}$ are similar to those described for $R^{11}$.

The following shows specific examples of the aliphatic hydrocarbon group that has 7 to 28 carbon atoms and is represented by $R^{11}$, $R^{21}$, $R^{22}$, $R^{31}$, $R^{32}$, $R^{41}$, $R^{42}$, $R^{43}$, $R^{51}$, $R^{52}$, $R^{53}$ and $R^{54}$, and specific examples of the aliphatic hydrocarbon group that has 9 to 28 carbon atoms and is represented by $R^{12}$, but the exemplary embodiment is not limited to these specific examples.

| $R^{11}$, $R^{12}$, $R^{21}$, $R^{22}$, $R^{31}$, $R^{32}$, $R^{41}$, $R^{42}$, $R^{43}$, $R^{51}$, $R^{52}$, $R^{53}$, $R^{54}$ Linear and saturated | | |
|---|---|---|
| —$C_6H_{12}CH_3$ | —$C_{12}H_{24}CH_3$ | —$C_{19}H_{38}CH_3$ |
| —$C_7H_{14}CH_3$ | —$C_{14}H_{28}CH_3$ | —$C_{20}H_{40}CH_3$ |
| —$C_8H_{16}CH_3$ | —$C_{15}H_{30}CH_3$ | —$C_{21}H_{42}CH_3$ |
| —$C_9H_{18}CH_3$ | —$C_{16}H_{32}CH_3$ | —$C_{23}H_{46}CH_3$ |
| —$C_{10}H_{20}CH_3$ | —$C_{17}H_{34}CH_3$ | —$C_{25}H_{50}CH_3$ |
| —$C_{11}H_{22}CH_3$ | —$C_{18}H_{36}CH_3$ | —$C_{27}H_{54}CH_3$ |

| $R^{11}$, $R^{12}$, $R^{21}$, $R^{22}$, $R^{31}$, $R^{32}$, $R^{41}$, $R^{42}$, $R^{43}$, $R^{51}$, $R^{52}$, $R^{53}$, $R^{54}$ Linear and unsaturated | |
|---|---|
| —CH=CH—$C_4H_8CH_3$ | —$C_2H_4$—CH=CH—$C_2H_4CH_3$ |
| —CH=CH—$C_6H_{12}CH_3$ | —$C_4H_8$—CH=CH—$C_4H_8CH_3$ |
| —CH=CH—$C_8H_{16}CH_3$ | —$C_5H_{10}$—CH=CH—$C_5H_{10}CH_3$ |
| —CH=CH—$C_{14}H_{28}CH_3$ | —$C_6H_{12}$—CH=CH—$C_6H_{12}CH_3$ |
| —CH=CH—$C_{15}H_{30}CH_3$ | —$C_7H_{14}$—CH=CH—$C_3H_6CH_3$ |
| —CH=CH—$C_{16}H_{32}CH_3$ | —$C_7H_{14}$—CH=CH—$C_5H_{10}CH_3$ |
| —CH=CH—$C_{17}H_{34}CH_3$ | —$C_7H_{14}$—CH=CH—$C_7H_{14}CH_3$ |
| —CH=CH—$C_{18}H_{36}CH_3$ | —$C_7H_{14}$—CH=CH—$C_8H_{16}CH_3$ |
| —CH=CH—$C_{20}H_{40}CH_3$ | —$C_7H_{14}$—CH=CH—$C_9H_{18}CH_3$ |
| —CH=CH—$C_{25}H_{50}CH_3$ | —$C_8H_{16}$—CH=CH—$C_8H_{16}CH_3$ |
| —$C_5H_{10}$—CH=$CH_2$ | —$C_9H_{18}$—CH=CH—$C_5H_{10}CH_3$ |
| —$C_7H_{14}$—CH=$CH_2$ | —$C_9H_{18}$—CH=CH—$C_7H_{14}CH_3$ |
| —$C_{15}H_{30}$—CH=$CH_2$ | —$C_{10}H_{20}$—CH=CH—$C_{12}H_{24}CH_3$ |
| —$C_{16}H_{32}$—CH=$CH_2$ | —$C_{10}H_{20}$—CH=CH—$C_{15}H_{30}CH_3$ |
| —$C_{17}H_{34}$—CH=$CH_2$ | —$C_{11}H_{22}$—CH=CH—$C_7H_{14}CH_3$ |
| —$C_{18}H_{36}$—CH=$CH_2$ | —$C_{12}H_{24}$—CH=CH—$C_{12}H_{24}CH_3$ |
| —$C_{21}H_{42}$—CH=$CH_2$ | —$C_{13}H_{26}$—CH=CH—$C_7H_{14}CH_3$ |
| —$C_{26}H_{52}$—CH=$CH_2$ | —$CH_2$—CH=CH—$C_7H_{14}$—CH=CH—$C_7H_{14}CH_3$ |
| —$CH_2$—CH=CH—$C_3H_6CH_3$ | —$C_7H_{14}$—CH=CH—$CH_2$—CH=CH—$C_4H_8CH_3$ |
| —$CH_2$—CH=CH—$C_7H_{14}CH_3$ | —$C_7H_{14}$—CH=CH—$C_7H_{14}$—CH=CH—$C_7H_{14}CH_3$ |
| —$CH_2$—CH=CH—$C_{10}H_{20}CH_3$ | —$C_7H_{14}$—CH=CH—$C_9H_{18}$—CH=CH—$C_7H_{14}CH_3$ |
| —$CH_2$—CH=CH—$C_{16}H_{32}CH_3$ | —$C_7H_{14}$—CH=CH—$CH_2$—CH=CH—$CH_2$—CH=CH—$CH_2CH_3$ |
| —$CH_2$—CH=CH—$C_{24}H_{48}CH_3$ | —CH=CH—$C_7H_{14}$—CH=CH—$C_7H_{14}$—CH=CH—$C_7H_{14}CH_3$ |

| $R^{11}$, $R^{12}$, $R^{21}$, $R^{22}$, $R^{31}$, $R^{32}$, $R^{41}$, $R^{42}$, $R^{43}$, $R^{51}$, $R^{52}$, $R^{53}$, $R^{54}$ Branched and saturated | |
|---|---|
| —$C_5H_{10}$—CH($CH_3)_2$ | —CH($C_2H_5$)—$C_7H_{14}CH_3$ |
| —$C_{10}H_{20}$—CH($CH_3)_2$ | —CH($C_2H_5$)—$C_{14}H_{28}CH_3$ |
| —$C_{14}H_{28}$—CH($CH_3)_2$ | —CH($C_2H_5$)—$C_{16}H_{32}CH_3$ |
| —$C_{15}H_{30}$—CH($CH_3)_2$ | —CH($C_2H_5$)—$C_{18}H_{36}CH_3$ |
| —$C_{16}H_{32}$—CH($CH_3)_2$ | —CH($C_4H_9$)—$C_{15}H_{30}CH_3$ |
| —$C_{17}H_{34}$—CH($CH_3)_2$ | —CH($C_6H_{13}$)—$C_{12}H_{24}CH_3$ |
| —$C_{20}H_{40}$—CH($CH_3)_2$ | —CH($C_6H_{13}$)—$C_{14}H_{28}CH_3$ |
| —$C_{25}H_{50}$—CH($CH_3)_2$ | —CH($C_6H_{13}$)—$C_{16}H_{32}CH_3$ |
| —$C_6H_{12}$—C($CH_3)_3$ | —$CH_2$—CH($CH_3$)—$C_3H_6CH_3$ |
| —$C_{10}H_{20}$—C($CH_3)_3$ | —$CH_2$—CH($CH_3$)—$C_6H_{12}CH_3$ |
| —$C_{14}H_{28}$—C($CH_3)_3$ | —$CH_2$—CH($CH_3$)—$C_8H_{16}CH_3$ |
| —$C_{15}H_{30}$—C($CH_3)_3$ | —$CH_2$—CH($CH_3$)—$C_{12}H_{24}CH_3$ |
| —$C_{16}H_{32}$—C($CH_3)_3$ | —$CH_2$—CH($CH_3$)—$C_{16}H_{32}CH_3$ |
| —CH($CH_3$)—$C_5H_{10}CH_3$ | —$CH_2$—CH($CH_3$)—$C_{20}H_{40}CH_3$ |
| —CH($CH_3$)—$C_{10}H_{20}CH_3$ | —$CH_2$—CH($CH_3$)—$C_{24}H_{48}CH_3$ |
| —CH($CH_3$)—$C_{13}H_{26}CH_3$ | —$CH_2$—CH($C_6H_{13}$)$_2$ |
| —CH($CH_3$)—$C_{14}H_{28}CH_3$ | —$CH_2$—CH($C_6H_{13}$)—$C_7H_{14}CH_3$ |
| —CH($CH_3$)—$C_{15}H_{30}CH_3$ | —$CH_2$—CH($C_6H_{13}$)—$C_9H_{18}CH_3$ |
| —CH($CH_3$)—$C_{16}H_{32}CH_3$ | —$CH_2$—CH($C_6H_{13}$)—$C_{12}H_{24}CH_3$ |
| —CH($CH_3$)—$C_{17}H_{34}CH_3$ | —$CH_2$—CH($C_6H_{13}$)—$C_{15}H_{30}CH_3$ |
| —CH($CH_3$)—$C_{18}H_{36}CH_3$ | —$CH_2$—CH($C_8H_{17}$)—$C_{19}H_{38}CH_3$ |
| —CH($CH_3$)—$C_{22}H_{44}CH_3$ | —$CH_2$—CH($C_8H_{17}$)—$C_9H_{18}CH_3$ |
| —CH($CH_3$)—$C_{25}H_{50}CH_3$ | —$CH_2$—CH($C_{10}H_{21}$)—$C_{12}H_{24}CH_3$ |
| —$C_2H_4$—CH($CH_3$)—$C_3H_6$—CH($CH_3$)—$C_3H_6$—CH($CH_3$)—$C_3H_6$—CH($CH_3$)$_2$ | |

| $R^{11}, R^{12}, R^{21}, R^{22}, R^{31}, R^{32}, R^{41}, R^{42}, R^{43}, R^{51}, R^{52}, R^{53}, R^{54}$ |
|---|
| Branched and unsaturated |

| | |
|---|---|
| —CH=CH—C$_5$H$_{10}$—CH(CH$_3$)$_2$ | —CH$_2$—CH=CH—CH(CH$_3$)—CH$_2$CH$_3$ |
| —CH=CH—C$_{12}$H$_{24}$—CH(CH$_3$)$_2$ | —CH$_2$—CH=CH—CH(CH$_3$)—C$_3$H$_6$CH$_3$ |
| —CH=CH—C$_{15}$H$_{30}$—CH(CH$_3$)$_2$ | —CH$_2$—CH=CH—CH(CH$_3$)—C$_7$H$_{14}$CH$_3$ |
| —CH=CH—C$_{16}$H$_{32}$—CH(CH$_3$)$_2$ | —CH$_2$—CH=CH—CH(CH$_3$)—C$_{16}$H$_{32}$CH$_3$ |
| —CH=CH—C$_{18}$H$_{36}$—CH(CH$_3$)$_2$ | —CH$_2$—CH=CH—CH(CH$_3$)—C$_{22}$H$_{44}$CH$_3$ |
| —CH=CH—C$_{23}$H$_{46}$—CH(CH$_3$)$_2$ | —CH$_2$—CH=CH—CH$_2$—CH(CH$_3$)—CH$_2$CH$_3$ |
| —CH=CH—C$_7$H$_{14}$—C(CH$_3$)$_3$ | —CH$_2$—CH=CH—C$_2$H$_4$—CH(CH$_3$)—C$_2$H$_4$CH$_3$ |
| —CH=CH—C$_{12}$H$_{24}$—C(CH$_3$)$_3$ | —CH$_2$—CH=CH—C$_2$H$_4$—CH(CH$_3$)—C$_4$H$_8$CH$_3$ |
| —CH=CH—C$_{14}$H$_{28}$—C(CH$_3$)$_3$ | —CH$_2$—CH=CH—C$_6$H$_{12}$—CH(CH$_3$)—C$_6$H$_{12}$CH$_3$ |
| —CH=CH—C$_{16}$H$_{32}$—C(CH$_3$)$_3$ | —CH$_2$—CH=CH—C$_7$H$_{14}$—CH(CH$_3$)—C$_7$H$_{14}$CH$_3$ |
| —CH=CH—C$_{20}$H$_{40}$—C(CH$_3$)$_3$ | —CH$_2$—CH=CH—C$_7$H$_{14}$—CH(CH$_3$)—C$_8$H$_{16}$CH$_3$ |
| —CH=CH—CH(C$_8$H$_{17}$)$_2$ | —CH$_2$—CH=CH—CH$_2$—CH=CH—CH(CH$_3$)—C$_3$H$_6$CH$_3$ |
| —CH=CH—CH(C$_6$H$_{13}$)—C$_7$H$_{14}$CH$_3$ | —CH$_2$—CH=CH—CH$_2$—CH=CH—CH(CH$_3$)—C$_7$H$_{14}$CH$_3$ |
| —CH=CH—CH(C$_6$H$_{13}$)—C$_{11}$H$_{22}$CH$_3$ | —CH$_2$—CH=CH—CH$_2$—CH=CH—CH(CH$_3$)—C$_{16}$H$_{32}$CH$_3$ |
| —CH=CH—CH(C$_8$H$_{17}$)—C$_9$H$_{18}$CH$_3$ | —CH$_2$—CH=CH—CH(CH$_3$)—CH=CH—CH$_2$—C$_3$H$_6$CH$_3$ |
| —CH=CH—CH(C$_8$H$_{17}$)—C$_{12}$H$_{24}$CH$_3$ | —CH$_2$—CH=CH—CH(CH$_3$)—CH=CH—CH$_2$—C$_7$H$_{14}$CH$_3$ |
| —C$_3$H$_6$—CH=CH—C$_5$H$_{10}$—CH(CH$_3$)$_2$ | —CH$_2$—CH=CH—CH(C$_2$H$_5$)—CH=CH—CH$_2$—C$_7$H$_{14}$CH$_3$ |
| —C$_7$H$_{14}$—CH=CH—C$_6$H$_{12}$—CH(CH$_3$)$_2$ | —CH$_2$—CH=CH—CH(CH$_3$)—CH=CH—CH$_2$—C$_{16}$H$_{32}$CH$_3$ |
| —C$_7$H$_{14}$—CH=CH—C$_7$H$_{14}$—CH(CH$_3$)$_2$ | —CH$_2$—CH=CH—CH(C$_2$H$_5$)—CH=CH—CH$_2$—C$_{16}$H$_{32}$CH$_3$ |
| —C$_8$H$_{16}$—CH=CH—C$_6$H$_{12}$—CH(CH$_3$)$_2$ | —CH$_2$—CH=CH—CH(CH$_3$)—CH=CH—CH$_2$—C$_{19}$H$_{38}$CH$_3$ |
| —C$_8$H$_{16}$—CH=CH—C$_7$H$_{14}$—CH(CH$_3$)$_2$ | —CH$_2$—CH=CH—CH(CH$_3$)—CH=CH—CH(CH$_3$)—CH$_2$CH$_3$ |
| —CH(CH$_3$)—C$_{14}$H$_{28}$—CH=CH$_2$ | —CH$_2$—CH=CH—CH(CH$_3$)—CH=CH—CH(CH$_3$)—C$_3$H$_6$CH$_3$ |
| —CH(CH$_3$)—C$_{16}$H$_{32}$—CH=CH$_2$ | —CH$_2$—CH=CH—CH(CH$_3$)—CH=CH—CH(CH$_3$)—C$_7$H$_{14}$CH$_3$ |
| —CH(C$_2$H$_5$)—C$_{14}$H$_{28}$—CH=CH$_2$ | —CH$_2$—CH=CH—CH(C$_2$H$_5$)—CH=CH—CH(C$_2$H$_5$)—C$_7$H$_{14}$CH$_3$ |
| —CH(C$_2$H$_5$)—C$_{16}$H$_{32}$—CH=CH$_2$ | —CH$_2$—CH=CH—CH(CH$_3$)—CH=CH—CH(CH$_3$)—C$_{12}$H$_{24}$CH$_3$ |
| —CH(C$_4$H$_9$)—C$_{14}$H$_{28}$—CH=CH$_2$ | —CH$_2$—CH=CH—CH(CH$_3$)—CH=CH—CH(CH$_3$)—C$_{15}$H$_{30}$CH$_3$ |
| —CH(C$_6$H$_{13}$)—C$_{10}$H$_{20}$—CH=CH$_2$ | —CH$_2$—CH=CH—CH(CH$_3$)—CH=CH—CH(CH$_3$)—C$_{18}$H$_{36}$CH$_3$ |
| —CH(C$_6$H$_{13}$)—C$_{12}$H$_{24}$—CH=CH$_2$ | —C$_4$H$_8$—CH=CH—C$_4$H$_8$—CH=CH—C$_4$H$_8$—CH(CH$_3$)$_2$ |
| —CH$_2$—CH(C$_6$H$_{13}$)—C$_7$H$_{14}$—CH=CH$_2$ | —C$_7$H$_{14}$—CH=CH—C$_7$H$_{14}$—CH=CH—C$_7$H$_{14}$—CH(CH$_3$)$_2$ |

One kind of ester compound (e1) other than the ester compound used as the plasticizer (D) may be used alone, or two or more kinds of ester compounds may be used in combination.

In addition, the resin composition according to the exemplary embodiment contains an oxidation inhibitor or a stabilizer as other components (E). The oxidation inhibitor or the stabilizer preferably contains at least one compound (e2) selected from the group consisting of a hindered phenol compound, a tocopherol compound, a tocotrienol compound, a phosphite compound and a hydroxylamine compound.

Specific examples of the compound (e2) include: a hindered phenol compound such as "Irganox 1010", "Irganox 245", "Irganox 1076" (manufactured by BASF), "ADK STAB AO-80", "ADK STAB AO-60", "ADK STAB AO-50", "ADK STAB AO-40", "ADK STAB AO-30", "ADK STAB AO-20", "ADK STAB AO-330" (manufactured by ADEKA), "Sumilizer GA-80", "Sumilizer GM", and "Sumilizer GS" (manufactured by SUMITOMO CHEMICAL CO., LTD.); a phosphite compound such as "Irgafos 38" (Bis (2,4-di-t-butyl-6-methylphenyl)-ethylphosphite) manufactured by BASF, "Irgafos 168" manufactured by BASF, "Irgafos TNPP" manufactured by BASF, and "Irgafos P-EPQ" manufactured by BASF; and a hydroxylamine compound such as "Irgastab FS-042" manufactured by BASF.

Further, specific examples of the tocopherol compound in the compound (e2) include the following compounds.

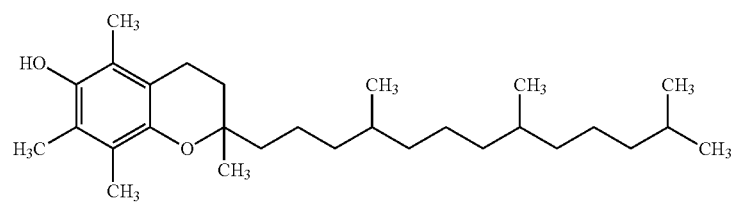

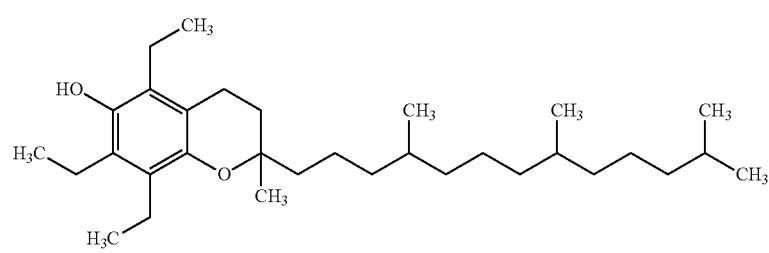

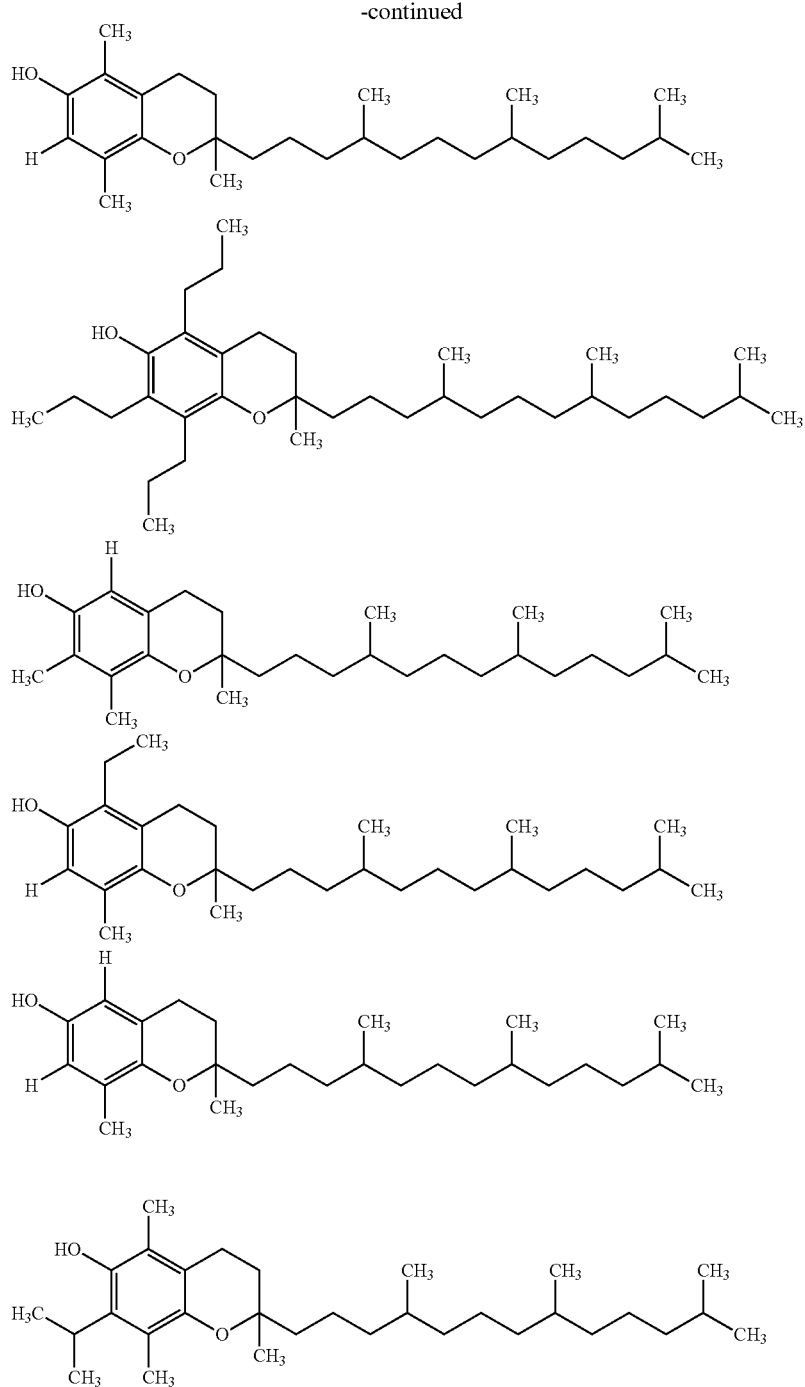
Specific examples of the tocotrienol compound in the compound (e2) include the following compounds.
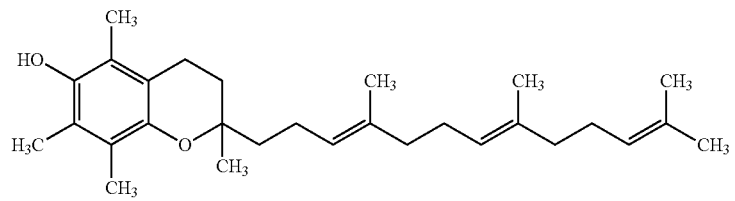

-continued

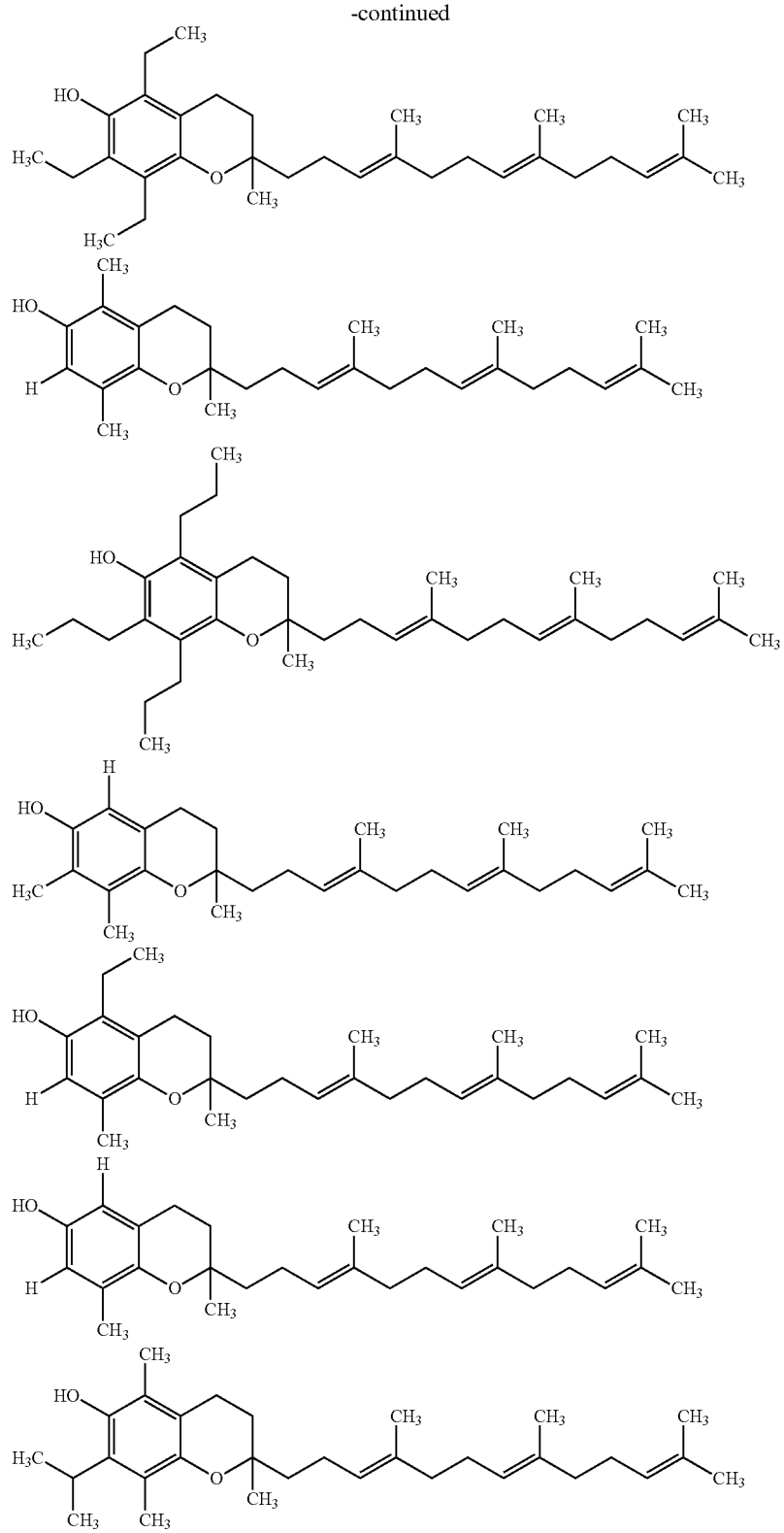

[Method for Producing Resin Composition]

Examples of a method for producing the resin composition according to the exemplary embodiment include: a method for mixing and melt-kneading the component (A), the component (B) and the component (C), and, if necessary, the component (D) and other components (E); a method for dissolving the component (A), the component (B) and the component (C) and, if necessary, the component (D) and other components (E) in a solvent; or the like. Units for melt kneading is not particularly limited, and examples thereof include a twin-screw extruder, a Henschel mixer, a Banbury mixer, a single-screw extruder, a multi-screw extruder, a co-kneader, or the like.

<Resin Molded Article>

The resin molded article according to the exemplary embodiment contains the resin composition according to the exemplary embodiment. That is, the resin molded article according to the exemplary embodiment has the same formulation as the resin composition according to the exemplary embodiment.

A method for molding the resin molded article according to the exemplary embodiment is preferably injection molding, from the viewpoint of obtaining a high degree of freedom in shape. Therefore, the resin molded article according to the exemplary embodiment is preferably an injection molded article obtained by injection molding, from the viewpoint of obtaining a high degree of freedom in shape.

The cylinder temperature during the injection molding of the resin molded article according to the exemplary embodiment is, for example, 160° C. to 280° C., and preferably 180° C. to 240° C. The mold temperature during the injection molding of the resin molded article according to the exemplary embodiment is, for example, 40° C. to 90° C., and more preferably 40° C. to 60° C.

Injection molding of the resin molded article according to the exemplary embodiment may be performed using, for example, commercially available apparatuses such as NEX500 manufactured by NISSEI PLASTIC INDUSTRIAL CO., LTD., NEX150 manufactured by NISSEI PLASTIC INDUSTRIAL CO., LTD., NEX7000 manufactured by NISSEI PLASTIC INDUSTRIAL CO., LTD., PNX40 manufactured by NISSEI PLASTIC INDUSTRIAL CO., LTD., and SE50D manufactured by SUMITOMO MACHINERY CORP.

The molding method for obtaining the resin molded article according to the exemplary embodiment is not limited to the injection molding described above, and, for example, extrusion molding, blow molding, heat press molding, calendaring molding, coating molding, cast molding, dipping molding, vacuum forming, transfer molding or the like may be applied to the molding method.

The resin molded article according to the exemplary embodiment is suitably used for applications such as electronic/electrical equipment, office equipment, household electric appliances, automotive interior materials, toys, containers, or the like. Specific applications of the resin molded article according to the exemplary embodiment include: casings of electronic/electrical equipment or home electric appliances; various parts of electronic/electrical equipment or home electric appliances; interior parts of automobiles; block assembled toys; plastic model kits; CD-ROM or DVD storage cases; tableware; beverage bottles; food trays; wrapping materials; films; sheets; or the like.

EXAMPLES

Hereinafter, the resin composition and the resin molded article according to the exemplary embodiment will be described in more detail with reference to examples. Materials, amounts, ratios, processing procedures, or the like shown in the following examples may be modified as appropriate without departing from the spirit of the resin composition and the resin molded article according to the exemplary embodiment. Therefore, the resin composition and the resin molded article according to the exemplary embodiment should not be interpreted restrictively by the following specific examples.

<Preparation of Each Material>

The following materials are prepared.

[Cellulose Acylate (A)]

CA1: "CAP482-20", manufactured by EASTMAN CHEMICAL COMPANY, cellulose acetate propionate, weight-average polymerization degree: 716, degree of acetyl group substitution: 0.18, degree of propionyl group substitution: 2.49.

CA3: "CAP504-0.2", manufactured by EASTMAN CHEMICAL COMPANY, cellulose acetate propionate, weight-average polymerization degree: 133, degree of acetyl group substitution: 0.04, degree of propionyl group substitution: 2.09.

CA4: "CAB171-15", manufactured by EASTMAN CHEMICAL COMPANY, cellulose acetate butyrate, weight-average polymerization degree: 754, degree of acetyl group substitution: 2.07, degree of butyryl group substitution: 0.73.

CA7: "L50", manufactured by DAICEL CORPORATION, diacetyl cellulose, weight-average polymerization degree: 570.

RC1: "Tenite propionate 360A4000012", manufactured by EASTMAN CHEMICAL COMPANY, cellulose acetate propionate, weight-average polymerization degree: 716, degree of acetyl group substitution: 0.18, degree of propionyl group substitution: 2.49. The product contains dioctyl adipate (corresponding to the component (C)). In the product, the content of cellulose acetate propionate is 88 mass %, and the content of dioctyl adipate is 12 mass %.

RC2: "Treva GC6021", manufactured by EASTMAN CHEMICAL COMPANY, cellulose acetate propionate, weight-average polymerization degree of 716, degree of acetyl group substitution of 0.18, degree of propionyl group substitution of 2.49. The product contains 3 mass % to 10 mass % of a chemical substance corresponding to a thermoplastic elastomer used as the components (D).

CA1 satisfied the following (2), (3), and (4). CA2 satisfied the following (4). (2) When the CAP is measured by a GPC method using tetrahydrofuran as a solvent, the weight-average molecular weight (Mw) in terms of polystyrene is 160,000 to 250,000, a ratio of the number average molecular weight (Mn) in terms of polystyrene to the Z-average molecular weight (Mz) in terms of polystyrene (Mn/Mz) is 0.14 to 0.21, and a ratio of the weight average molecular weight (Mw) in terms of polystyrene to the Z-average molecular weight (Mz) (Mw/Mz) in terms of polystyrene is 0.3 to 0.7. (3) When the CAP is measured by capillography at 230° C. in accordance with ISO 11443: 1995, a ratio of a viscosity η1 (Pa s) at a shear rate of 1216 (/sec) to a viscosity η2 (Pa s) at a shear rate of 121.6 (/sec) (η1/η2) is 0.1 to 0.3. (4) When a small square plate test piece (D11 test piece specified by JIS K7139: 2009, 60 mm×60 mm, thickness 1 mm) obtained by injection molding of the CAP is left for 48 hours in an atmosphere at a temperature of 65° C. and a relative humidity of 85%, both an expansion coefficient in a MD direction and an expansion coefficient in a TD direction are 0.4% to 0.6%.

[Polymer (B)]

EL 6: "Blendex 338" manufactured by GALATA CHEMICALS (ARTEK), a polymer (b1) having a core-shell structure formed of an acrylonitrile-butadiene-styrene (AB S) copolymer.

EL7: "Kraton FG1924G" manufactured by KRATON CORPORATION, a styrene-ethylene-butadiene-styrene copolymer (b2).
EL8: "Estane ALR 72A" manufactured by LUBRIZO, polyurethane (b3).
EL9: "Hytrel 3078", manufactured by DU PONT-TORAY CO., LTD., a polyester copolymer aromatic polyester (b4).
[Plasticizer (C)]
PL1: "NX-2026" manufactured by CARDOLITE, cardanol, molecular weight: 298 to 305.
PL 4: "Ultra LITE 513" manufactured by CARDOLITE, a glycidyl ether of cardanol, molecular weight: 354 to 361.
PL6: "Daifatty 101", manufactured by DAIHACHI CHEMICAL INDUSTRY CO., LTD., an adipate-containing compound, molecular weight: 326 to 378.
PL7: "DOA", manufactured by MITSUBISHI CHEMICAL CORPORATION, dioctyl adipate, molecular weight: 371.
PL13: "PEG #600" manufactured by NOF CORPORATION, polyethylene glycol, molecular weight: 600.
[Aliphatic Polyester (D)]
PE1: Nature Works "Ingeo 3001D", polylactic acid.
[Other Components (E)]
EL3: "Paraloid EXL 2315" manufactured by DOW CHEMICAL JAPAN, a polymer having a core-shell structure, core layer: butyl acrylate, rubber/shell: a methyl methacrylate polymer, average primary particle size=300 nm.
LU1: "stearyl stearate" manufactured by FUJIFILM WAKO PURE CHEMICAL CORPORATION, stearyl stearate. In the compound represented by the General Formula (1), $R^{11}$ has 17 carbon atoms, and $R^{12}$ has 18 carbon atoms.
PM1: "Delpet 720 V" manufactured by ASAHI KASEI CORPORATION, polymethylmethacrylate.
ST1: "Irganox B225" manufactured by BASF, a mixture of tetrakis [3-(3',5'-di-t-butyl-4'-hydroxyphenyl) propionic acid] pentaerythritol and tris (2,4-di-t-butylphenyl) phosphite.

Production of Resin Composition and Injection Molding of Resin Molded Article

Examples 1 to 19, Comparative Examples 1 to 7

Kneading is performed with a biaxial kneader (LTE20-44, manufactured by LABTECH ENGINEERING) at feed amounts and kneading temperatures shown in Tables 1 and 2) to obtain a pellet (resin composition). An ISO multi-purpose test piece (in accordance with ISO3167 (2014) type A, dumbbell shape, dimension of measurement part: width: 10 mm, thickness: 4 mm) is molded, by using the pellet, with an injection molding machine (NEX500I manufactured by NISSEI PLASTIC INDUSTRIAL CO., LTD.) at an injection peak pressure not exceeding 180 MPa, and at molding temperatures and mold temperatures shown in Table 2.

In addition, an ASTM test piece (strip shaped test piece: length×width×thickness=127 mm×12.7 mm×6.4 mm) is molded.

Further, the following test piece is molded. Hollow cylindrical test piece: outer diameter p: 25.6 mm, inner diameter p: 20 mm, length: 15 mm
<Performance Evaluation of Resin Molded Article>
—ISO Heat Distortion Temperature (Deflection Temperature Under Load)—

A deflection temperature under load at 1.8 MPa of the obtained ISO multi-purpose test piece is measured by a HDT measurement apparatus (HDT 3A-2, manufactured by TOYO SEIKI SEISAKU-SHO, LTD.) using a method in accordance with the ISO75-2 A (2013) method.
—ASTM Heat Distortion Temperature (Deflection Temperature Under Load)—

A deflection temperature under load at 0.455 MPa of the obtained ASTM test piece is measured by a HDT measurement apparatus (HDT 3A-2, manufactured by TOYO SEIKI SEISAKU-SHO, LTD.) using a method in accordance with the ASTM D648-07 B method.

Evaluation of Squeaking Noises

The hollow cylindrical test pieces molded from the same material (contact area 2.0 cm$^2$) are rotated and slid using a plastic sliding abrasion tester (YASUDA SEIKI SEISAKUSHO, LTD.) under the conditions of a temperature of 23° C. and a humidity of 50% RH. The occurrence situation of squeaking noises is evaluated while the speed is constant at 10 mm/sec and the surface pressure is increased by 0.1 MPa per minute. The presence or absence of the squeaking noises is judged by a sensory test, and a load at the time of judging the squeaking noises is determined as an acoustic noise generating load.

Evaluation Criteria A: No squeaking noises (more than 2.5 MPa and equal to or less than 3.0 MPa); B: Squeaking noises are very small (more than 1.8 MPa and equal to or less than 2.5 MPa); C: Squeaking noises are slightly larger (more than 1.0 MPa and equal to or less than 1.8 MPa); D: Squeaking noises are very large (equal to or less than 1.0 MPa).

TABLE 1

| | Cellulose acylate (A) | | Polymer (B) | | Plasticizer (C) | | Aliphatic Polyester (D) | | Other components (E) | | | | | |
|---|---|---|---|---|---|---|---|---|---|---|---|---|---|---|
| | Kind | Parts by mass | Kind | Parts by mass | Kind | Parts by mass | Kind | Parts by mass | Kind | Parts by mass | Kind | Parts by mass | Kind | Parts by mass |
| Example 1 | CA1 | 91.5 | EL6 | 7.5 | PL1 | 8.5 | | | | | | | ST1 | 0.5 |
| Example 2 | CA1 | 91.5 | EL6 | 7.5 | PL1 | 8.5 | PE1 | 5 | PM1 | 5 | LU1 | 2 | ST1 | 0.5 |
| Example 3 | RC2 | 100 | EL6 | 2.5 | PL1 | 5 | | | | | | | ST1 | 0.5 |
| Example 4 | RC1 | 100 | EL6 | 5 | Contain components derived from RC1 | | | | PM1 | 15 | | | ST1 | 0.5 |
| Example 5 | CA3 | 91.5 | EL6 | 7.5 | PL1 | 8.5 | | | | | | | ST1 | 0.5 |
| Example 6 | CA4 | 91.5 | EL6 | 7.5 | PL1 | 12 | | | | | | | ST1 | 0.5 |
| Example 7 | CA7 | 85 | EL6 | 7.5 | PL1 | 15 | | | | | | | ST1 | 0.5 |
| Example 8 | CA1 | 91.5 | EL6 | 7.5 | PL4 | 8.5 | | | | | | | ST1 | 0.5 |
| Example 9 | CA1 | 91.5 | EL6 | 7.5 | PL6 | 8.5 | | | | | | | ST1 | 0.5 |
| Example 10 | CA1 | 91.5 | EL6 | 7.5 | PL1 | 5 | | | | | | | ST1 | 0.5 |

TABLE 1-continued

| | Cellulose acylate (A) | | Polymer (B) | | Plasticizer (C) | | Aliphatic Polyester (D) | | Other components (E) | | | | | |
|---|---|---|---|---|---|---|---|---|---|---|---|---|---|---|
| | Kind | Parts by mass | Kind | Parts by mass | Kind | Parts by mass | Kind | Parts by mass | Kind | Parts by mass | Kind | Parts by mass | Kind | Parts by mass |
| Example 11 | CA1 | 91.5 | EL7 | 7.5 | PL1 | 8.5 | | | | | | | ST1 | 0.5 |
| Example 12 | CA1 | 91.5 | EL8 | 7.5 | PL1 | 8.5 | | | | | | | ST1 | 0.5 |
| Example 13 | CA1 | 91.5 | EL9 | 7.5 | PL1 | 8.5 | | | | | | | ST1 | 0.5 |
| Example 14 | CA1 | 87.5 | EL6 | 7.5 | PL1 | 12 | | | | | | | ST1 | 0.5 |
| Example 15 | CA1 | 91.5 | EL6 | 7.5 | PL13 | 8.5 | | | | | | | | |
| Example 16 | CA1 | 91.5 | EL6 | 7.5 | PL1 | 8.5 | | | | | | | | |
| Example 17 | CA1 | 91.5 | EL6 | 7.5 | PL1 | 2.5 | | | | | | | ST1 | 0.5 |
| Example 18 | CA1 | 91.5 | EL6 | 2.5 | PL1 | 8.5 | | | | | | | ST1 | 0.5 |
| Example 19 | CA1 | 91.5 | EL6 | 15 | PL1 | 8.5 | | | | | | | ST1 | 0.5 |
| Comparative example 1 | CA1 | 98 | EL6 | 2 | | | | | | | | | ST1 | 1 |
| Comparative example 2 | CA4 | 100 | EL6 | 10 | | | | | | | | | | |
| Comparative example 3 | CA1 | 83 | | | PL6 | 17 | EL3 | 7.5 | | | | | | |
| Comparative example 4 | CA1 | 88 | | | PL7 | 12 | | | | | | | ST1 | 0.5 |
| Comparative example 5 | CA1 | 90 | EL6 | 10 | | | | | | | | | ST1 | 0.5 |
| Comparative example 6 | CA1 | 80 | EL6 | 20 | | | | | | | | | | |
| Comparative example 7 | CA1 | 85 | EL6 | 5 | PL1 | 10 | | | | | | | | |

TABLE 2

| | Kneading temperature (° C.) | molding temperature (° C.) | mold temperature (° C.) | HDT (ASTM D648-07 B method) (° C.) | HDT (ISO 75-2 A method) (° C.) | squeaking noises |
|---|---|---|---|---|---|---|
| Example 1 | 200 | 200 | 40 | 89 | 65 | A |
| Example 2 | 200 | 200 | 40 | 90 | 68 | A |
| Example 3 | 210 | 210 | 40 | 92 | 70 | B |
| Example 4 | 200 | 200 | 40 | 88 | 63 | A |
| Example 5 | 200 | 200 | 40 | 92 | 68 | A |
| Example 6 | 200 | 200 | 40 | 89 | 73 | A |
| Example 7 | 220 | 220 | 40 | 95 | 80 | C |
| Example 8 | 210 | 210 | 40 | 86 | 65 | A |
| Example 9 | 210 | 210 | 40 | 87 | 65 | A |
| Example 10 | 210 | 210 | 40 | 86 | 65 | A |
| Example 11 | 210 | 210 | 40 | 85 | 65 | A |
| Example 12 | 210 | 210 | 40 | 84 | 65 | A |
| Example 13 | 210 | 210 | 40 | 87 | 68 | A |
| Example 14 | 200 | 200 | 40 | 83 | 61 | B |
| Example 15 | 210 | 210 | 40 | 88 | 64 | B |
| Example 16 | 210 | 210 | 40 | 88 | 65 | A |
| Example 17 | 220 | 220 | 40 | 94 | 71 | B |
| Example 18 | 230 | 230 | 60 | 86 | 65 | B |
| Example 19 | 210 | 210 | 40 | 86 | 65 | B |
| Comparative example 1 | 230 | 230 | 75 | 116 | 94 | D |
| Comparative example 2 | 240 | 240 | 80 | 120 | 97 | D |
| Comparative example 3 | 180 | 180 | 60 | 73 | 51 | D |
| Comparative example 4 | 200 | 200 | 40 | 90 | 72 | D |
| Comparative example 5 | 230 | 230 | 70 | 107 | 83 | D |
| Comparative example 6 | 220 | 220 | 60 | 94 | 73 | D |
| Comparative example 7 | 210 | 210 | 40 | 101 | 82 | D |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
cellulose acrylate (A), wherein the degree of substitution of the cellulose acrylate (A) is 2.1 to 2.9;
at least a polymer (B) selected from the group consisting of:
  a polymer (b1) having a core-shell structure including:
    a core layer containing a butadiene polymer, and
    a shell layer located on a surface of the core layer and containing a polymer selected from a styrene polymer and an acrylonitrile-styrene polymer;
  a styrene-ethylene-butadiene-styrene copolymer (b2);
  polyurethane (b3); and
  aromatic polyester (b4); and
a plasticizer (C), wherein the plasticizer is at least one selected from a group consisting of a cardanol compound, dicarboxylic acid diester, citrate, a polyether compound having one or more unsaturated bonds, a polyether ester compound, glycol benzoate, a compound represented by the following General Formulae (6) and epoxidized fatty acid ester:

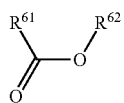

General Formula (6)

wherein, in the General Formula (6),
$R^{61}$ represents an aliphatic hydrocarbon group having 7 to 28 carbon atoms, and
$R^{62}$ represents an aliphatic hydrocarbon group having 1 to 8 carbon atoms;
  wherein the cellulose acrylate (A) is at least one selected from a group consisting of cellulose acetate, cellulose acetate propionate, and cellulose acetate butyrate;
  wherein the polymer (B) is present in an amount in a mass ratio of (B):(A) in the range of 0.05 to 0.2;
  wherein the plasticizer (C) is present in an amount in a mass ratio of (C):(A) in the range of 0.03 to 0.2;
  wherein a resin molded article obtained by molding the resin composition has a heat distortion temperature according to at least one of the following (1) and/or (2):
  (1) a heat distortion temperature of 95° C. or less measured in accordance with ASTM D648-07 B; and/or
  (2) a heat distortion temperature of 80° C. or less measured in accordance with ISO 75-2 A (2013);
  wherein the resin composition comprises polyhydroxyalkanoate (PHA) in an amount in a mass ratio of PHA:(A) in the range of 0:1 to 0.15:1.

2. The resin composition according to claim 1, wherein the resin molded article by molding the resin composition has a heat distortion temperature according to at least one of the following (1) and/or (2):
  (1) a heat distortion temperature of 90° C. or less measured in accordance with ASTM D648-07 B; and/or
  (2) a heat distortion temperature of 75° C. or less measured in accordance with ISO 75-2 A (2013).

3. The resin composition according to claim 1, wherein the cellulose acrylate (A) is at least one selected from a group consisting of cellulose acetate propionate and cellulose acetate butyrate.

4. The resin composition according to claim 1, wherein the cellulose acrylate (A) is at least one selected from a group consisting of cellulose acetate propionate and cellulose acetate butyrate.

5. The resin composition according to claim 3, wherein the polymer (B) is present in an amount in a mass ratio of (B):(A) in the range of 0.07 to 0.15.

6. The resin composition according to claim 5, wherein the plasticizer (C) is present in an amount in a mass ratio of (C):(A) in the range of 0.05 to 0.1.

7. The resin composition according to claim 1, wherein the resin composition further comprises an aliphatic polyester (D), with the proviso that, if (D) comprises PHA, the PHA is present in an amount in a mass ratio of PHA:(A) of 0.15:1 or less.

8. The resin composition according to claim 2, wherein the resin composition further comprises an aliphatic polyester (D), with the proviso that, if (D) comprises PHA, the PHA is present in an amount in a mass ratio of PHA:(A) of 0.15:1 or less.

9. The resin composition according to claim 3, wherein the resin composition further comprises an aliphatic polyester (D), with the proviso that, if (D) comprises PHA, the PHA is present in an amount in a mass ratio of PHA:(A) of 0.15:1 or less.

10. The resin composition according to claim 4, wherein the resin composition further comprises an aliphatic polyester (D), with the proviso that, if (D) comprises PHA, the PHA is present in an amount in a mass ratio of PHA:(A) of 0.15:1 or less.

11. The resin composition according to claim 5, wherein the resin composition further comprises an aliphatic polyester (D), with the proviso that, if (D) comprises PHA, the PHA is present in an amount in a mass ratio of PHA:(A) of 0.15:1 or less.

12. The resin composition according to claim 6, wherein the resin composition further comprises an aliphatic polyester (D), with the proviso that, if (D) comprises PHA, the PHA is present in an amount in a mass ratio of PHA:(A) of 0.15:1 or less.

13. The resin composition according to claim 7, wherein the aliphatic polyester (D) is polyhydroxyalkanoate (PHA) and the PHA is present in an amount in a mass ratio of PHA:(A) of 0.15:1 or less.

14. The resin composition according to claim 8, wherein the aliphatic polyester (D) is polyhydroxyalkanoate (PHA) and the PHA is present in an amount in a mass ratio of PHA:(A) of 0.15:1 or less.

15. The resin composition according to claim 9, wherein the aliphatic polyester (D) is polyhydroxyalkanoate (PHA) and the PHA is present in an amount in a mass ratio of PHA:(A) of 0.15:1 or less.

16. The resin composition according to claim 10, wherein the aliphatic polyester (D) is polyhydroxyalkanoate (PHA) and the PHA is present in an amount in a mass ratio of PHA:(A) of 0.15:1 or less.

17. The resin composition according to claim 13, wherein the aliphatic polyester (D) includes polylactic acid (PLA) and wherein the total PHA content, including PLA, is present in an amount in a mass ratio of PHA:(A) of 0.15:1 or less.

18. A resin molded article comprising the resin composition according to claim 1.

19. The resin molded article according to claim 18, wherein the resin molded article is an injection molded article.

\* \* \* \* \*